(12) United States Patent
Hassibi et al.

(10) Patent No.: US 7,170,954 B2
(45) Date of Patent: Jan. 30, 2007

(54) CAYLEY-ENCODATION OF UNITARY MATRICES FOR DIFFERENTIAL COMMUNICATION

(75) Inventors: Babak Hassibi, Pasadena, CA (US); Bertrand M. Hochwald, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1042 days.

(21) Appl. No.: 10/077,849

(22) Filed: Feb. 20, 2002

(65) Prior Publication Data

US 2002/0163892 A1   Nov. 7, 2002

Related U.S. Application Data

(63) Continuation-in-part of application No. 09/356,387, filed on Jul. 16, 1999, now Pat. No. 6,724,842.

(60) Provisional application No. 60/269,838, filed on Feb. 20, 2001.

(51) Int. Cl.
*H04L 27/00* (2006.01)
*H04B 7/00* (2006.01)
*H04J 11/00* (2006.01)

(52) U.S. Cl. .................... 375/299; 370/310; 370/203

(58) Field of Classification Search ............... 375/299, 375/340, 347; 370/334, 310, 203
See application file for complete search history.

(56) References Cited

U.S. PATENT DOCUMENTS

| 3,835,392 | A  | * | 9/1974  | Mahner et al. ............. 455/138 |
| 6,724,842 | B1 | * | 4/2004  | Hochwald et al. .......... 375/347 |
| 6,801,579 | B1 | * | 10/2004 | Hassibi et al. ............. 375/264 |
| 2004/0228271 | A1 | * | 11/2004 | Marzetta ..................... 370/210 |
| 2005/0105644 | A1 | * | 5/2005  | Baxter et al. ............... 375/316 |

OTHER PUBLICATIONS

Gamal, Hesham, On the Design of Layered Space-Time Systems For Autocoding, Sep. 2002, IEEE Transactions on Communications, vol. 50, Issue 9, pp. 1451-1461.*
Hassibi et al., Cayley Differential Unitary Space-Time Codes, Jun. 2002, IEEE Transactions on Information Theory, vol. 48, Issue 6, pp. 1485-1503.*
Matsuoka et al., A Kurtosis-Based Separation of Sources Using the Cayley Transform, Oct. 1-4, 2000, IEEE 2000 Communications, and Control Symposium, pp. 369-374.*
Hassibi et al, Unitary Space-Time Codes and the Cayley Transform, May 13-17, 2002, IEEE International Conference on Acoustics, Speech, and Signal Processing, vol. 3, pp. III-2409-III-2412.*
B. Hassibi and B.M. Hochwald, "Cayley Differential Unitary Space-Time Codes," Aug. 31, 2001, http://mars.bell-labs.com/cm/ms/what/mars/papers/cayley/.

* cited by examiner

*Primary Examiner*—Emmanuel Bayard
*Assistant Examiner*—Lawrence Williams

(57) ABSTRACT

Differential unitary space-time (DUST) communication is a technique for communicating via one or more antennas by encoding the transmitted data differentially using unitary matrices at the transmitter, and decoding differentially without knowing the channel coefficients at the receiver. Since channel knowledge is not required at the receiver, DUST is ideal for use on wireless links where channel tracking is undesirable or infeasible. Disclosed are a class of Cayley codes for DUST communication that can produce sets of unitary matrices that work with any number of antennas, and has efficient encoding and decoding at any rate. The codes are named for their generation via the Cayley transform, which maps the highly nonlinear Stiefel manifold of unitary matrices to the linear space of skew-Hermitian matrices. The Cayley codes can be decoded using either successive nulling/cancelling or sphere decoding.

32 Claims, 7 Drawing Sheets

CAYLEY-ENCODATION OF UNITARY MATRICES FOR DIFFERENTIAL COMMUNICATION

CONTINUING APPLICATION INFORMATION

The present application is a Continuation-In-Part ("CIP") under 35 U.S.C. § 120 of U.S. patent application Ser. No. 09/356,387 filed Jul. 16, 1999, now U.S. Pat. No. 6,724,842 the entirety of which is hereby incorporated by reference.

The present application also claims priority under 35 U.S.C. § 119(e) upon Provisional U.S. Patent Application Ser. No. 60/269,838 filed Feb. 20, 2001, the entirety of which is hereby incorporated by reference.

FIELD OF THE INVENTION

The present invention is directed toward a method of communication in which the input data is encoded using unitary matrices, transmitted via one or more antennas and decoded differentially at the receiver without knowing the channel characteristics at the receiver, and more particularly to technology for producing a set of unitary matrices for such encoding/decoding using Cayley codes.

BACKGROUND OF THE INVENTION

Although reliable mobile wireless transmission of video, data, and speech at high rates to many users will be an important part of future telecommunications systems, there is considerable uncertainty as to what technologies will achieve this goal. One way to get high rates on a scattering-rich wireless channel is to use multiple transmit and/or receive antennas. Many of the practical schemes that achieve these high rates require the propagation environment or channel to be known to the receiver.

In practice, knowledge of the channel is often obtained via training: known signals are periodically transmitted for the receiver to learn the channel, and the channel parameters are tracked (using decision feedback or automatic-gain-control (AGC)) in between the transmission of the training signals. However, it is not always feasible or advantageous to use training-based schemes, especially when many antennas are used or either end of the link is moving so fast that the channel is changing very rapidly.

Hence, there is much interest in space-time transmission schemes that do not require either the transmitter or receiver to know the channel. A standard method used to combat fading in single-antenna wireless channels is differential phase-shift keying (DPSK). In DPSK, the transmitted signals are unit-modulus (typically chosen from a m-PSK set), information is encoded differentially on the phase of the transmitted signal, and as long as the phase of the channel remains approximately constant over two consecutive channel uses, the receiver can decode the data without having to know the channel coefficient.

Differential techniques for multi-antenna communications have been proposed, where, as long as the channel is approximately constant in consecutive uses, the receiver can decode the data without having to know the channel. The general differential techniques of the Background Art have good performance when the set of matrices used for transmission forms a group under matrix multiplication, which also leads to simple decoding rules.

But the number of groups available is rather limited, and the groups do not lend themselves to very high rates (such as tens of bits/sec/Hz) with many antennas. One of the Background Art techniques is based on orthogonal designs, and therefore has simple encoding/decoding and works well when there are two transmit and one receive antenna, but suffers otherwise from performance penalties at very high rates.

Part of the difficulty of designing large sets of unitary matrices is the lack of simple parameterizations of these matrices. To keep the transmitter and receiver complexity low in multiple antenna systems, linear processing is often preferred, whereas unitary matrices are often highly nonlinear in their parameters.

SUMMARY OF THE INVENTION

The invention, in part, provides a partial and yet robust solution to the general design problem for differential transmission, for rate R (in bits/channel use) with M transmit antennas for an unknown channel.

The invention, also in part, provides Cayley Differential ("CD") codes that break the data stream into substreams, but instead of transmitting these substreams directly, these substreams are used to parameterize the unitary matrices that are transmitted. The codes work with any number of transmit and receive antennas and at any rate. The Cayley code advantages include that they:

1. Are very simple to encode;
2. Can be used for any number of transmit and receive antennas;
3. Can be decoded in a variety of ways including simple polynomial-time linear-algebraic techniques such as:
   (a) Successive nulling and canceling and (b) Sphere decoding;
4. Are designed with the numbers of both the transmit and receive antennas in mind; and
5. Satisfy a probabilistic criterion namely, maximization of an expected distance between matrix pairs.

Additional features and advantages of the invention will be more fully apparent from the following detailed description of the preferred embodiments, the appended claims and the accompanying drawings.

The accompanying drawings are: intended to depict example embodiments of the invention and should not be interpreted to limit the scope thereof; and not to be considered as drawn to scale unless explicitly noted.

DETAILED DESCRIPTION OF PREFERRED EMBODIMENTS

Using Cayley Differential ("CD") codes for differential unitary space-time (DUST) communication includes two aspects. The first is transmitting/receiving data with the CD codes, which necessarily involves calculating the CD codes. The second aspect is designing how the actual CD codes will be calculated. It should be noted that the first aspect assumes that the second aspect has been performed at least once.

The first aspect of Cayley-encoded DUST communication itself includes two aspects, namely (A) Cayley-encoding and transmitting, and (B) receiving and Cayley-decoding.

A few statements about notation will be made. The notation $\alpha_1, \ldots, \alpha_Q$ indicates a set of real-valued scalars each member of which is referred to as a parameter $\alpha$, there being a total of Q such parameters. Another way to refer to the set $\alpha_1, \ldots, \alpha_Q$ is via the notation: $\{\alpha_q\}$. Each $\alpha_q$ will take its value to be one of the elements in the set known as A (the reader should be careful to note that this fancy symbol is the letter "A" in the Euclid Math One font in order to distinguish from a Hermitian basis matrix known as "A" which will be discussed below). Mention will also be made of a set of matrices referred to as $\{A\}$, as well as a subset having Q elements, referred to as $\{A_q\}$.

Figure 6:
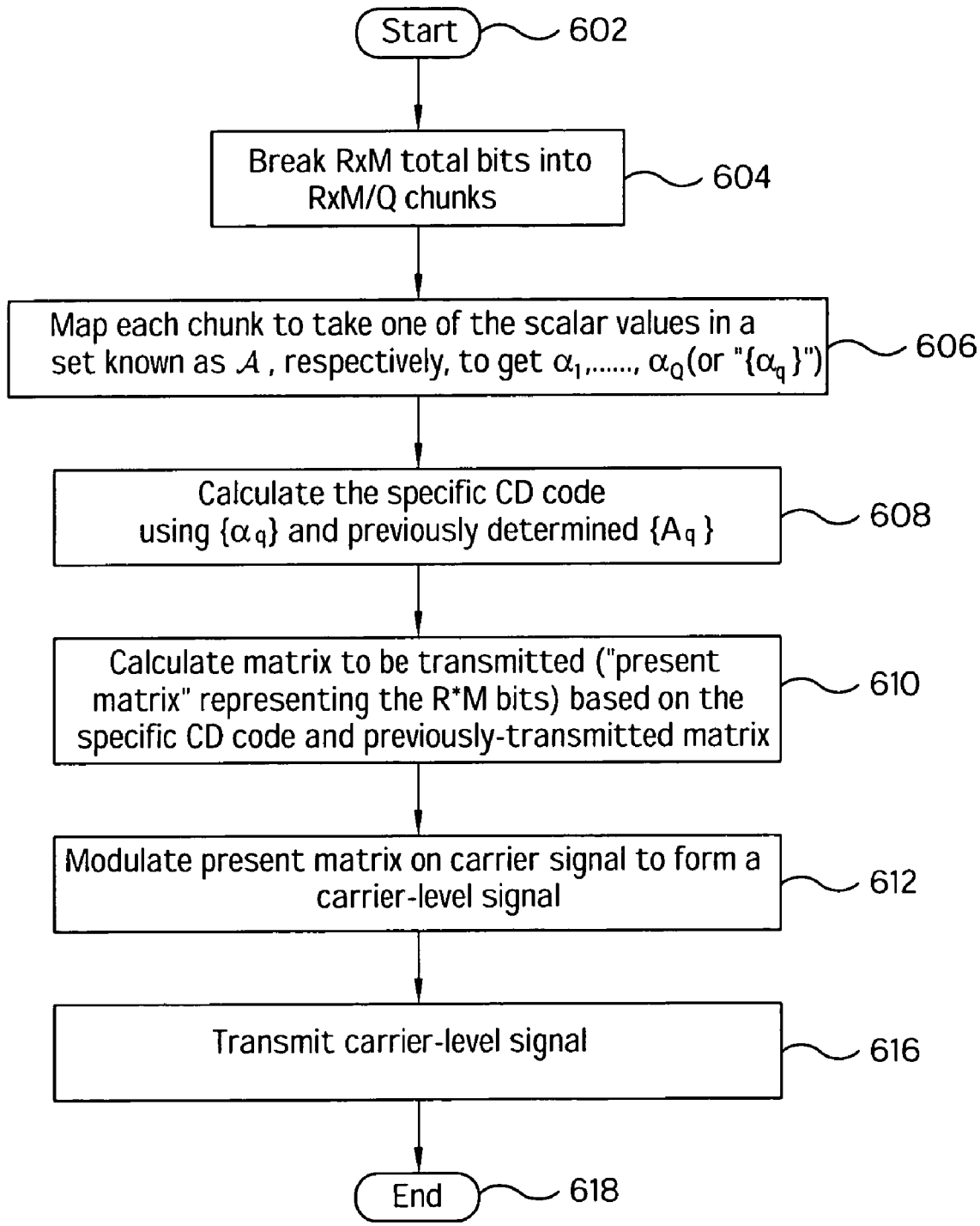
FIG. 6 is a flow chart of steps included in a transmitting method according to an embodiment of the invention.

As depicted in FIG. 6, transmitting R*M bits of Cayley-encoded data (starting at step 602) can include: (step 604) breaking the R*M total bits of data to be transmitted into R*M/Q chunks; (step 606) mapping each of the Q chunks of R*M/Q bits to take one of the different scalar values found in the set A, where A has $r=2^{RM/Q}$ elements and A has been has been previously determined (A and its role will be discussed below), i.e., assigning a specific value from A to each chunk, respectively, in order to get $\alpha_1, \ldots, \alpha_Q$ (also referred to as ""$\{\alpha_q\}$") (below $\{\alpha_q\}$ and its role will be discussed); (step 608) calculating the specific CD code according to (Eq. No. 9, introduced below) using $\{\alpha_q\}$ and $\{A_q\}$ (where $\{A_q\}$ has been previously determined; see the discussion below of the second aspect); (step 610) calculating the matrix to be transmitted (the "present matrix" representing the R*M bits) based on the specific CD code and the previously-transmitted matrix according to the fundamental transmission equation (Eq. No. 4, introduced below); (step 612) modulating the present matrix on a carrier to form a carrier-level signal; and (step 616) transmitting the carrier-level signal (with flow ending at step 618).

Figure 7:
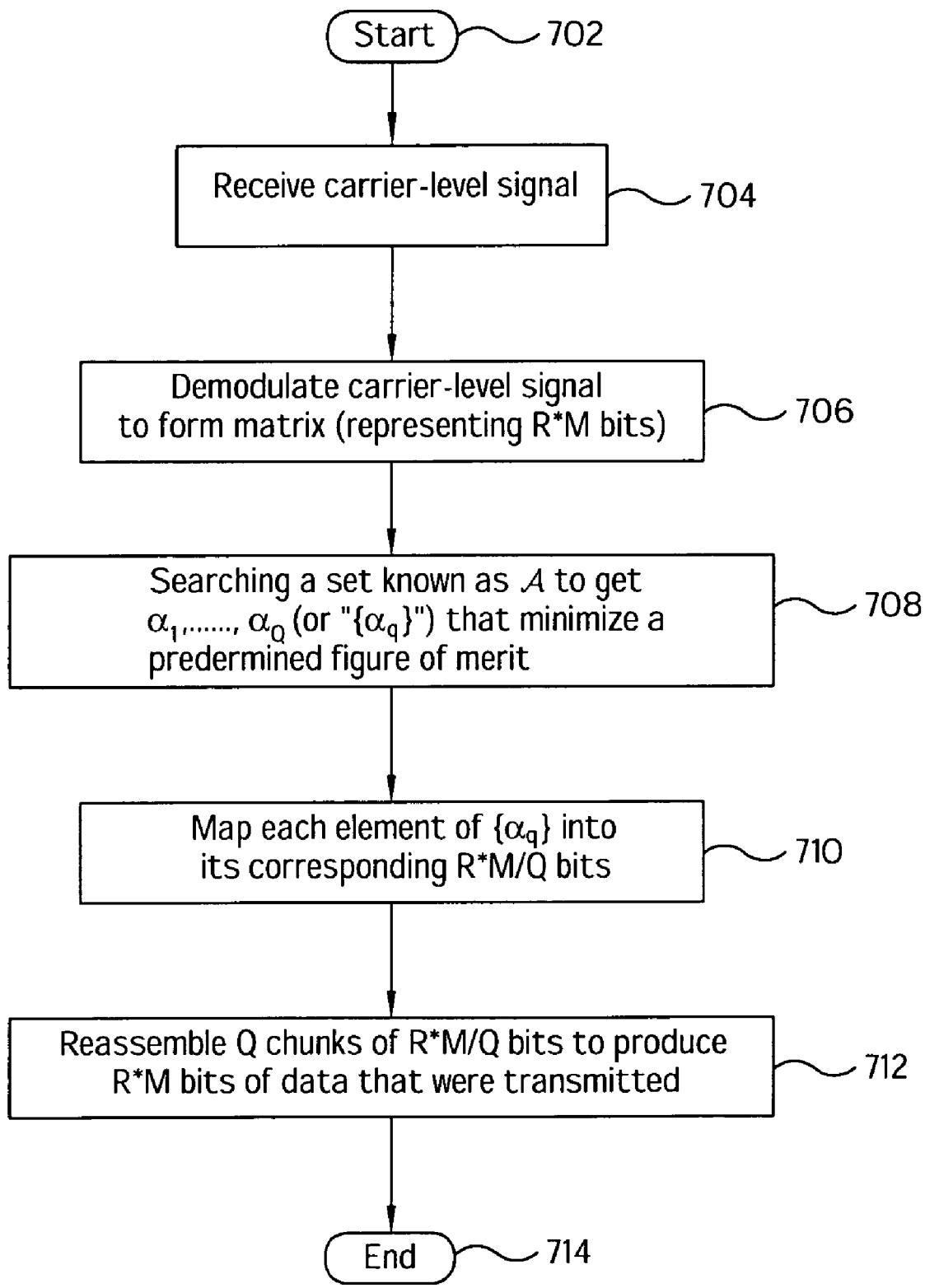
FIG. 7 is a flow chart of steps included in a receiving method according to an embodiment of the invention.

As depicted in FIG. 7, receiving R*M bits of Cayley-encoded data (starting at step 702) can include: (step 704) receiving a carrier-level signal; (step 706) demodulating the carrier-level signal to form a matrix (representing R*M bits); (step 708) searching the set known as A to find Q specific scalar values, namely $\alpha_1, \ldots, \alpha_Q$ (or $\{\alpha_q\}$), that minimize (Eq. No. 12, introduced below) or (Eq. No. 13, introduced below, which can be solved more quickly albeit less accurately than (Eq. No. 12)); (step 710) mapping each element of $\{\alpha_q\}$ into its corresponding R*M/Q bits using a predetermined mapping relation; and (step 712) reassembling Q chunks of R*M/Q bits to produce the R*M bits of data that were transmitted (with flow ending at step 714).

The second aspect of Cayley-encoded DUST communication, namely the design of the CD codes, is to determine the non-data parameters of the CD code (Eq. No. 9, introduced below). This includes: determining the set of $A_q$ ("$\{A_q\}$"); and the A from which are selected $\alpha_1, \ldots, \alpha_Q$ (or $\{\alpha_q\}$). The $\{A_q\}$ is independent of the data to be transmitted but is dependent upon the transmitter/receiver hardware. Both $\{A_q\}$ and A will be known to the transmitter and to the receiver.

Determining A can include: (1) substituting the number of transmitting antennas, M, and the number of receiving antennas, N, into (Eq. No. 15, introduced below) to get the number of degrees of freedom, Q; (2) determining how many elements, r, will be in A according to the equation $r=2^{(RM/Q)}$ (a rewriting of (Eq. No. 22, introduced below)); (3) establishing the set of $\theta$ ("$\{\theta\}$") according to the equation $\{\theta\}=\{\pi/r, 3\pi/r, 5\pi/r, \ldots (2r-1) \pi/r\}$; and establishing A by substituting $\{\theta\}$ into (Eq. No. 17, introduced below).

The $\{A_q\}$ can be determined by solving (Eq. No. 18, introduced below) using the A determined above, e.g., via an iterative technique such as the gradient-ascent method. An iterative technique will find a $\{A_q\}$ which causes (Eq. No. 18) to yield a maximum value (see (Eq. No. 19, introduced below)). But an iterative technique will not necessarily find the optimal $\{A_q\}$ among all possible $\{A\}$, rather it will find the optimal value for that particular iterative technique being used.

Cayley codes, according to an embodiment of the invention are briefly summarized as follows. To generate a unitary matrix V parameterized by the transmitted data, we break the data stream into Q substreams (we specify Q later) and use these substreams to chose $\alpha_1, \ldots, \alpha_Q$ each from the set A with r real-valued elements (we also have more to say about this set later). A Cayley code of a rate R, where R=(Q/M) $\log_2 r$ obeys the following equation (known as the Cayley Transform)

$$V=(I+iA)^{-1}(I-iA) \quad (1)$$

where $$A = \sum_{q=1}^{Q} A_q \alpha_q,$$

I is the identity matrix of the relevant dimension and $A_1, \ldots, A_Q$ are pre-selected M×M complex Hermitian matrices.

The matrix V, as given by (2), is referred to as the Cayley transform of iA and is unitary.

The Cayley code is completely specified by $A_1, \ldots, A_Q$ and A. Each individual codeword is determined by the scalars $\alpha_1, \ldots, \alpha_Q$.

The performance of a Cayley code according to an embodiment of the invention depends on the choices of the number of substreams Q, the Hermitian basis matrices $\{A_q\}$, and the set A from which each $\alpha_q$ is chosen. Roughly speaking, Q is chosen so as to maximize the number of independent degrees of freedom observed at the output of the channel. To choose the $\{A_q\}$, a coding criterion can be optimized (to be discussed below) that resembles $|\det(V_{l'}-V_{l'})|$ but is more suitable for high rates and is amenable to analysis. The optimization need be done only once, during code design, and it is amenable to gradient-based methods.

The Cayley transform (Eq. No. 1) is powerful because it generates the unitary matrix V from the Hermitian matrix A, and A is linear in the data $\alpha_1, \ldots, \alpha_Q$.

For the purposes of the present application, it suffices to assume that the channel has a coherence interval (defined to be the number of samples at the sampling rate during which the channel is approximately constant) that is at least twice the number of transmit antennas.

1. Review of Differential Unitary Space-Time ("DUST") Modulation

The following is a brief summary of the differential, unitary matrix signaling scheme disclosed in the copending application, Ser. No. 09/356,387, which has been incorporated by reference above in its entirety.

In a narrow-band, flat-fading, multi-antenna communication system with M transmit and N receive antennas, the transmitted and received signals are related by $$x = \sqrt{p}sH + v, \quad (2)$$

where $x \in C^{1 \times N}$ and x denotes the vector of complex received signals during any given channel use, p represents the signal-to-noise ratio ("SNR") at the receiver, $s \in C^{1 \times M}$ and s denotes the vector of complex transmitted signals, $H \in C^{M \times N}$ and H denotes the channel matrix, and the additive noise $v \in C^{1 \times N}$ and v is assumed to have independent CN (0, 1) (zero-mean, unit-variance, complex-Gaussian) entries that are temporally white.

The channel is used in blocks with there being M channel uses per block. We can then aggregate the transmit row vectors s over these blocks of M channel uses into an M×M matrix $S_\tau$, where $\tau = 0, 1, \ldots$ represents each block of channel uses. In this setting, the $m^{th}$ column of $S_\tau$ denotes what is transmitted on the $m^{th}$ antenna in each instance of time unit t within block $\tau$, and the $m^{th}$ row denotes what is transmitted during the $m^{th}$ time unit of block $\tau$ on by each of the M antennas. If we assume that the channel is constant over the M channel uses, i.e., over each block $\tau$, the input and output row vectors are related through a common channel so that we may represent the received matrix $X_\tau$ as a function of the transmitted matrix $S\tau$ according to the following equation:

$$X_\tau = \sqrt{p}S_\tau H + W_\tau, \quad (3)$$

where W, and H are M×N matrices of independent CN (0,1) random variables, $X_\tau$ is the M×N received complex signal matrix and $S_\tau$ is the M×N transmitted complex signal matrix.

In differential unitary space-time modulation, the transmitted matrix at block $\tau$ satisfies the following so-called fundamental transmission equation $$S_\tau = V_{Z_\tau} S_{\tau-1} \quad (4)$$

where $Z_\tau \in \{0, \ldots, L-1\}$ is the data to be transmitted in the form of the code matrix $V_{Z_\tau}$ (assume $S_0 = I$). Since the channel is used a total of M times, the corresponding transmission rate is $R = (Q/M)\log_2 L$. If we further assume that the propagation environment is approximately constant for 2M consecutive channel uses, then we may write $$X_\tau = \sqrt{p}S_\tau H + W_\tau = \sqrt{p}V_{Z_\tau}S_{\tau-1}H + W_\tau = V_{Z_\tau}(X_{\tau-1} - W_{\tau-1}) + W_\tau \quad (5)$$

which leads us to the fundamental differential receiver equation $$X_\tau = V_{Z_\tau}X_{\tau-1} + \underbrace{W_\tau - V_{Z_\tau}W_{\tau-1}}_{W'_\tau}. \quad (6)$$

Note that the channel matrix H does not appear in Eq. No. (6), i.e., H was substituted for in Eq. No. (5). This implies that, as long as the channel is approximately constant for 2M channel uses, differential transmission permits decoding without knowing the fading matrix H.

From Eq. No. (5) it is apparent that the matrices $V_l$ should be unitary, otherwise the product $S_\tau = V_{Z_\tau} V_{Z_{\tau-1}} \cdots V_{Z_1}$ can go to zero, infinity, or both (in different spatial and temporal directions).

In general, the number of unitary M×M matrices in V can be quite large. For example, if rate R=8 is desired with M=4 transmit antennas (even larger rates are quite possible as shown later), then the number of matrices is $L = 2^{RM} = 2^{32} \approx 4 \times 10^9$, and the pairwise error between any two signals can be very small. This huge number of signals calls into question the feasibility of computing a figure of merit, $\zeta$, where $$\zeta = \frac{1}{2} \min_{l \neq l'} |\det(V_l - V_{l'})|^{\frac{1}{M}}$$

and lessens its usefulness as a performance criterion. We therefore consider a different, though related, criterion (to be discussed below).

The large number of signals imposes a large computational load when decoding via an exhaustive search. For high rates, it is possible to construct a random set with some structure. But, again, we have no efficient decoding method. To design sets that are huge, effective, and yet still simple, so that they can be decoded in real-time, it is explained below how the Cayley transform can be used to parameterize unitary matrices.

2. The Stiefel Manifold

The space of M×M complex unitary matrices is referred to as the Stiefel manifold. This is the space from which will be selected a subset of unitary matrices that data (to be transmitted) will be mapped-to and received data mapped-from. The Stiefel manifold is highly nonlinear and nonconvex, and can be parameterized by $M^2$ real free parameters.

3. The Cayley Transform

The Cayley transform of a complex M×M matrix Y is defined to be $$(I_M + Y)^{-1}(I_M - Y), \quad (7)$$

where $I_M$ is the M×M identity matrix and Y is assumed to have no eigenvalues at −1 so that the inverse exists (hereafter the M subscript on I will be dropped). Note that I−Y, I+Y, $(I-Y)^{-1}$ and $(I+Y)^{-1}$ all commute so there are other equivalent ways to write this transform.

Compared with other parameterizations of unitary matrices, the parameterization with the Cayley transform is not "too nonlinear" (to be discussed below) and it is one-to-one and easily invertible. The Cayley transform also maps the complicated Stiefel manifold of unitary matrices to the space of skew-Hermitian matrices. Skew-Hermitian matrices are easy to characterize since they form a linear vector space over the real numbers (the real linear combination of any number of skew-Hermitian matrices is skew-Hermitian). And this handy feature will be used below for easy encoding and decoding.

It should be recognized that the Cayley transform is the matrix generalization of the scalar transform $$v = \frac{1-ia}{1+ia}$$

that maps the real line to the unit circle. This map is also called a bilinear map and is often used in complex analysis. The Cayley transform (Eq. No. 7) maps matrices with eigenvalues inside the unit circle to matrices with eigenvalues in the right-half-plane.

An important observation to be made is that of Full Diversity. A set of unitary matrices $\{V_0, \ldots, V_L\}$ is fully-diverse, i.e., $|\det(V-V_{l'})|$ is nonzero for all $l \neq l'$ if and only if the set of its skew-Hermitian Cayley transforms $\{Y_0, \ldots, Y_L\}$ is fully-diverse. Moreover, we have $$V_l - V_{l'} = 2(I+Y_l)^{-1}[Y_l - Y_{l'}](I+Y_{l'})^{-1}. \quad (8)$$

Thus, to design a fully-diverse set of unitary matrices into which will be mapped the data that is to be transmitted, we can design a fully-diverse set of skew-Hermitian matrices and then employ the Cayley transform. This design technique is used in an example below.

4. Cayley Differential Codes

Because the Cayley transform maps the nonlinear Stiefel manifold to the linear space of skew-Hermitian matrices (and vice-versa) it is convenient to do two things: (1) encode data onto a skew-Hermitian matrix; and then (2) apply the Cayley transform to get a unitary matrix. It is most straightforward to encode the data linearly.

Again, a Cayley Differential ("CD") code, A, is a type of unitary matrix that satisfies the Cayley transform $$V = (I+iA)^{-1}(I-iA), \quad \text{(again, 2)}$$

where the CD code, i.e., matrix A, is Hermitian and is given by $$A = \sum_{q=1}^{Q} \alpha_q A_q, \quad (9)$$

and where $\alpha_1, \ldots, \alpha_Q$ are real scalars (chosen from a set A with r possible values) (in other words, mapped based upon the data to be transmitted) and where $A_q$ are fixed M×M complex Hermitian matrices.

The code, i.e., the set of unitary matrices $\{V\}$, is completely determined by the set of matrices $A_1, \ldots, A_Q$, which can be thought of as Hermitian basis matrices. Each individual codeword, i.e., each unitary matrix V, on the other hand, is determined by our choice of the scalars $\alpha_1, \ldots, \alpha_Q$. Since each $\alpha_q$ may each take on r possible values (i.e., the set A from which values for $\alpha_q$ are taken has r values), and the code occupies M channel uses, then the transmission rate, R, is $R = (Q/M) \log_2 r$. Finally, since an arbitrary M×M Hermitian matrix is parameterized by $M^2$ real variables, we have the constraint $$Q \leq M^2 \quad (10)$$

Below, as a consequence of the preferred decoding algorithm, a more stringent constraint on Q will be suggested.

The discussion of how to choose Q and design the $A_q$'s and the set A follows after the discussion of how to decode $\alpha_1, \ldots, \alpha_Q$ at the receiver.

5. Decoding the CD Codes

An important property of the CD codes is the ease with which the receiver may form a system of linear equations in the variables $\{\alpha_q\}$. To see this, it is useful to substitute the Cayley transform (Eq. No. (1)) into the fundamental receiver equation (Eq. No. (6)), $$X_\tau = V_{Z_\tau} X_{\tau-1} + W_\tau - V_{Z_\tau} W_{\tau-1}$$
$$= (I+iA)^{-1}(I-iA)X_{\tau-1} + W_\tau - (I+iA)^{-1}(I-iA)W_{\tau-1}$$

implying that $$(I+iA)X_\tau = (I-iA)X_{\tau-1} + (I+iA)W_\tau - (I-iA)W_{\tau-1},$$

or $$X_\tau - X_{\tau-1} = A\frac{1}{i}(X_\tau + X_{\tau-1}) + (I+iA)W_\tau - (I-iA)W_{\tau-1}, \quad (11)$$

which is linear in A. Since the data $\{\alpha_q\}$ is also linear in A, then (Eq. No. 11) is linear in $\{\alpha_q\}$.

Consider first the maximum-likelihood estimation of the $\{\alpha_q\}$. Using (Eq. No. 17) and noting that the additive noise $(I+iA)W_T - (I-iA)W_{T-1}$ has independent columns with covariance $2(I+iA)(I-iA) = 2(I+A^2)$ shows that the maximum likelihood ("ML") decoder is $$\hat{\alpha}_{ml} = \underset{\{\alpha_q\}}{\arg\min} \left\| (I+iA)^{-1}\left((X_\tau - X_{\tau-1}) - \frac{1}{i}A(X_\tau + X_{\tau-1})\right) \right\|^2;$$

or, more explicitly, $$\hat{\alpha}_{ml} = \quad (12)$$

$$\arg \underset{\{\alpha_q\}}{\min} \left\| \left(I + i\sum_{q=1}^{Q}\alpha_q A_q\right)^{-1} \left(X_\tau - X_{\tau-1} - \frac{1}{i}\sum_{q=1}^{Q}\alpha_q A_q(X_\tau + X_{\tau-1})\right) \right\|^2.$$

This decoder is not quadratic in $\{\alpha_q\}$ and so may be difficult to solve. However, if we ignore the covariance of the additive noise in (Eq. No. 11) and assume that the noise is simply spatially white, then we obtain the linearized ML decoder $$\hat{\alpha}_{lin} = \arg \underset{\{\alpha_q\}}{\min} \left\| X_\tau - X_{\tau-1} - \frac{1}{i}\sum_{q=1}^{Q}\alpha_q A_q(X_\tau + X_{\tau-1}) \right\|^2 \quad (13)$$

We call the decoder "linearized" because the system of equations obtained in solving (Eq. No. 13) for unconstrained $\{\alpha_q\}$ is linear.

Because (Eq. No. 13) is quadratic in $\{\alpha_q\}$, a simple approximate solution for $\{\alpha_q\}$ chosen from a fixed set can use nulling and canceling. An exact solution without an exhaustive search can use sphere decoding.

6. The Number of Independent Equations

Nulling and canceling explicitly requires that the number of equations be at least as large as the number of unknowns. Sphere decoding does not have this hard constraint, but it benefits from more equations because the computational complexity grows exponentially in the difference between the number of unknowns and equations. If this difference is not very large, sphere decoding is still feasible.

7. Design of the CD Codes

Although we have introduced the CD code $$A = \sum_{q=1}^{Q} \alpha_q A_q, \quad \text{(again, 9)}$$

we have not yet specified Q, nor have we explained how to design the Hermitian basis matrices $A_1, \ldots, A_Q$ or choose the discrete set A from which the $\alpha_q$ are selected. We now address these issues.

7.1. Choice of Q

To make the set of all possible CD codes as rich as possible, we should make the number of degrees of freedom Q as large as possible. Though the parameter Q can be any size, it has been found that restricting Q as follows, $$Q \leq K(2M-K); \text{ where } K=\min(M,N), \quad (14)$$

makes it possible to strike a good balance between information content and performance versus computational load. Therefore, as a general practice, we can take Q at its upper limit in (Eq. No. 14), $$Q=\min(N,M)*\max(2M-N,M). \quad (15)$$

If sphere decoding is used we sometimes exceed this limit (yielding more unknowns than equations; see examples in Section 3), but $Q \leq M^2$ should be obeyed.

We are left with how to design $A_1, \ldots, A_Q$ and how to choose the discrete set A. If the rates being considered are reasonably small (for example, R<4), then the criterion of maximizing $|\det(V_l - V_{l'})|$ for all $\lambda' \neq \lambda$ is tractable. Recall that any set $V_1, \ldots, V_Q$ for which this determinant is nonzero for all $\lambda' \neq \lambda$ is said to be fully diverse.

It has been shown above (in the discussion of (Eq. No. 8)) that a set of unitary matrices is fully diverse if and only if the corresponding Cayley-transformed set of skew-Hermitian matrices is fully-diverse. Since $$A' - A = \sum_{q=1}^{Q} A_q(\alpha'_q - \alpha_q),$$

by considering $\alpha$ and $\alpha'$ that differ in only one coordinate q, we see that it is necessary (but not sufficient) for $A_1, \ldots, A_Q$ to be nonsingular. Some examples of full diversity for small rates and small number of antennas are shown below.

At high rates, however, it is preferred not to pursue the full-diversity criterion. The reasons include: first, the criterion becomes intractable because of the number of matrices involved; and second, the performance of the set may not be governed so much by its worst-case pairwise $|\det(V_l - V_{l'})|$, but rather by how well the matrices are distributed throughout the space of unitary matrices. One reason why group sets do not perform very well at high rates is because they lack the required statistical structure of a good high rate set.

7.2. Choice of A

At high rates, a CD code $A = \sum_{q=1}^{Q} A_q \alpha_q$ should resemble samples from a Cauchy random matrix distribution. We look first at the implications of the example where there is one transmit antenna M=1. In this case the optimal strategy is standard DPSK.

For the example of M=1, we are limited by (Eq. No. 14) to Q=1 in this example, and there is no loss of generality in setting $A_1=1$ to get $$v = \frac{1-i\alpha_1}{1+i\alpha_1}, \alpha_1 = -i\frac{1-v}{1+v} \quad (16)$$

To get rate $R=(Q/M)\log_2 L$ with $M=Q=1$ we need A to have $r=2^R$ points. Standard DPSK puts these points uniformly around the unit circle at angular intervals of $2\pi/r$ with the first point at angle $\pi/r$. (The location of the first point does not affect the set's performance in any way, but it helps us avoid a formal singularity in the inversion formula (Eq. No. 16) at v=−1). For a point at angle Θ on the unit circle, $$\alpha = -i\frac{1-e^{i\theta}}{1-e^{i\theta}} = -\tan(\theta/2). \quad (17)$$

For example, for r=2 (D-BPSK, i.e., differential binary PSK), we have $V=\{e^{\pi i/2}, e^{-\pi i/2}\}$. Plugging these values into (Eq. No. 17) yields {−1,1}. For r=4, (D-QPSK i.e., differential quad PSK), we have {−1−√2, 1−√2,−1+√2, 1+√2{=}−2.4142; −0.4142; 0.4142; 2.4142) (where the points are arranged in increasing order). For r=8, {−5.0273, −1.4966, −0.6682, −0.1989, 0.1989, 0.6682, 1.4966, 5.0273}.

We see that the points rapidly spread themselves out as r increases, thus reflecting the long tail of the Cauchy distribution ($p(a)=1/\pi(1+a^2)$). We denote A to be the image of the function (Eq. No. 17) applied to the set $\theta \in \{\pi/r, 3\pi/r, 5\pi/r, \ldots, (2r-1)\pi/r\}$. In the limit as $r \to \infty$, the fraction of points in A less than some x is given by the cumulative Cauchy distribution evaluated at x. The A thus be regarded as an r-point discretization of a scalar Cauchy random variable.

While this argument tells us how to choose the set A as a function of r when Q=M=1, it does not directly show us how to choose A when M>1. Thus, the $\{\alpha_q\}$ are chosen as discretized scalar Cauchy random variables for any Q and M. To complete the code construction, $\{A_1, \ldots, A_Q\}$ should be chosen appropriately, and we present a criterion in the next section.

7.3. Choice of $\{A_q\}$

We shift our attention away from the final distribution on A and express our design criterion in terms of V. For a given $A_1, \ldots, A_Q$ and A, we define a distance criterion for the resulting set of matrices V to be $$\xi(V) = \frac{1}{M} E \log \det(V - V')(V - V')^* = \frac{2}{M} E \log|\det(V - V')|, \quad (18)$$

where $V' = (I+iA')^{-1}(I-iA')$, $A' = \sum_{q=1}^{Q} A_q \alpha'_q$, and the expectation is over $\alpha_1, \ldots \alpha_Q$ and $\alpha'_1, \ldots, \alpha'_Q$ chosen uniformly from A such that $\alpha \neq \alpha'$. Although $\xi(V)$ is often negative, it is a measure of the expected "distance" between the random matrices V and V'.

To choose the $A_q$'s, we therefore propose the optimization problem $$\underset{A_q = A_q^*, q=1,\ldots Q}{\operatorname{argmax}} \xi(V). \qquad (19)$$

Our choices of $A_q$ and A affect the distance criterion through the distribution $p_V(\cdot)$ that they impose on the V matrices. It will now be shown that this criterion is maximized when V and V' are independently chosen isotropic matrices. Such maximization can be done via gradient-ascent techniques, e.g., *Optimization: Theory and Practice*, Gordon Beveridge and Robert Shechter, McGraw-Hill, 1970.

We interpret (Eq. No. 18) as a measure of the average distance between matrices in the set. If the set A and $A_1, \ldots, A_Q$ are chosen such that V (namely, the Cayley transform (Eq. No. 1)) is approximately isotropically distributed when A is sampled uniformly, then the average distance should be large.

We use (Eq. No. 8), and the fact that matrices commute inside the determinant function, to write the optimization as a function of A and A', $$\underset{A_q = A_q^*, q=1,\ldots Q}{\operatorname{arg\,max}} \begin{bmatrix} \log 4 - \dfrac{1}{M} E \log \det(I + A^2) - \\ \dfrac{1}{M} E \log \det(I + A'^2) + \\ \dfrac{1}{M} E \log \det(A - A')^2 \end{bmatrix} \qquad (20)$$

where $A = \sum_{q=1}^{Q} A_q \alpha_q$, $A' = \sum_{q=1}^{Q} A_q \alpha'_q$. For a set with $\alpha_1, \ldots \alpha_Q$ and $\alpha'_1, \ldots \alpha'_Q$ chosen from $A_r$, we interpret the expectation as uniform over A such that $\alpha \neq \alpha'$.

It is occasionally useful, especially when r is large, to replace the discrete set from which $\alpha_q$ and $\alpha_q'$ are chosen (A) with independent scalar Cauchy distributions. In this case, since the sum of two independent Cauchy random variables is scaled-Cauchy, our criterion simplifies to $$\underset{A_q = A_q^*, q=1,\ldots Q}{\operatorname{arg\,max}} \begin{bmatrix} 2 \log 4 - \dfrac{2}{M} E \log \det(I + A^2) + \\ \dfrac{1}{M} E \log \det A^2 \end{bmatrix} \qquad (21)$$

where $$A = \sum_{q=1}^{Q} A_q \alpha_q$$

and the expectation is over $\alpha_1, \ldots \alpha_Q$ chosen independently from a Cauchy distribution.

7.4. CD Code

We now summarize the design method for a CD code with M transmit and N receive antennas, and target rate R.

(i) Choose $Q \leq \min(N,M) * \max(2M-N,M)$. This inequality is a hard limit for decoding by nulling/canceling (e.g., G. D. Golden, G. J. Foschini, R. A. Valenzuela, and P. W. Wolniansky, "Detection algorithm and initial laboratory results using V-BLAST space-time communication architecture," Electronic Letters, Vol. 35, pp. 14–16, January 1999, or G. J. Foschini, G. D. Golden, R. A. Valenzuela, and P. W. Wolniansky, "Simplified processing for high spectral efficiency wireless communication employing multi-element arrays," J. Sel. Area Comm., vol. 17, pp. 1841–1852, November 1999) and Q is typically chosen to make it an equality. But the inequality is a soft limit for sphere decoding (e.g., U. Fincke and M. Pohst, "Improved methods for calculating vectors of short length in a lattice, including a complexity analysis," Mathematics of Computation, vol. 44, pp. 463–471, April 1985, or M. O. Damen, A. Chkeif, and J. -C. Belfiore, "Lattice code decoder for space-time codes," IEEE Comm. Let., pp. 161–163, May 2000) and we may choose Q as large as $M^2$ even if N<M.

(ii) Since $R=(Q/M)*\log_2(r)$, set $r=2^{MR/Q}$. Let A be the r-point discretization of the scalar Cauchy distribution obtained as the image of the function (Eq. No. 17) applied to the set $\{\theta\} \square \{\pi/r, 3\pi/r, 5\pi/r, \ldots (2r-1) \pi/r\}$.

(iii) Choose a set $\{A_q\}$ that solves the optimization problem (Eq. No. 20).

The following is to be noted.

A. The solution to (Eq. No. 20) is highly nonunique: simply reordering the $\{A_q\}$ gives another solution, as does changing the signs of the $\{A_q\}$, since the sets A are symmetric about the origin.

B. It does not appear that (Eq. No. 20) has a simple closed-form solution for general Q, M, and N, but presented below is a special case where a closed-form solution appears.

C. Numerical methods, e.g. gradient-ascent methods, can be used to solve (Eq. No. 20). The computation of the gradient of the criterion in (Eq. No. 20) is presented in the Appendix, the entirety of which is hereby incorporated by reference. Since the criterion function is nonlinear and nonconcave in the design variables $\{A_q\}$, there is no guarantee of obtaining a global maximum. However, since the code design can be performed off-line and need only be performed once, one can use more sophisticated optimization techniques that vary the initial condition, use second-order methods, use simulated annealing, etc. Below it is shown that the CD codes obtained with a gradient search tend to have very good performance.

D. The entries of $\{A_q\}$ in (Eq. No. 20) are unconstrained other than that the final matrix must be Hermitian. Appealing to symmetry arguments, however, we have found it beneficial to constrain the Frobenius norm of all the matrices in $\{A_q\}$ to be the same. It is preferred, both for the criterion function (Eq. No. 20) and for the ultimate set performance, that the correct Frobenius norm of the basis matrices be chosen. With the correct Frobenius norm, choosing an initial condition for the $\{A_q\}$ in the gradient search becomes easier.

The gradient for the Frobenius norm has a simple closed form which we now give. It can be used to solve for the optimal norm. Let $\sqrt{\gamma}$ be a multiplicative factor that we use to multiply every $A_q$; we solve for the optimal $\gamma>0$ by maximizing the criterion function $$\underset{A_q = A_q^*, q=1,\ldots,Q}{\operatorname{arg\,max}} \xi(V),$$

that is $$\arg\max_{\gamma} \begin{bmatrix} 2\log 4 - \dfrac{2}{M} E\log\det(I+\gamma A^2) + \\ \dfrac{1}{M} E\log\det \gamma A^2 \end{bmatrix}$$

$$= \arg\max_{\gamma} \left[ \log\gamma + \dfrac{2}{M} E\log\det(I+\gamma A^2) \right]$$

The optimal $\gamma$ therefore sets the gradient of this last equation to zero:

$$0 = \dfrac{1}{\gamma} - \dfrac{2}{M} E\,tr\left[(I+\gamma A^2)^{-1} A^2\right]$$

$$= \dfrac{1}{\gamma} - \dfrac{2}{M} E\,tr\left[((I+\gamma A^2)^{-1})\dfrac{1}{\gamma}(I+\gamma A^2 - I)\right]$$

$$= \dfrac{1}{\gamma}\left(1 - \dfrac{2}{M} E\,tr\left[I-(I+\gamma A^2)^{-1}\right]\right)$$

$$= \dfrac{1}{\gamma}\left(-1 + \dfrac{2}{M} E\,tr(I+\gamma A^2)^{-1}\right)$$

The equation $$-1 + \dfrac{2}{M} E\,tr(I+\gamma A^2)^{-1} = 0$$

can readily be solved numerically for $\gamma$.

E. The ultimate rate of the code depends on the number of signals sent, namely Q, and the size of the set A from which $\alpha_1, \ldots, \alpha_Q$ are chosen. The code rate in bits/channel is $$R = \dfrac{Q}{M}\log_2 r. \tag{22}$$

We generally choose r to be a power of two.

F. The design criterion (Eq. No. 20) depends explicitly on the number of receive antennas N through the choice of Q. Hence, the optimal codes, for a given M, are different for different N.

G. The variable Q is essentially also a design variable. The CD code performance is generally best when Q is chosen as large as possible. For example, a code with a given Q and r is likely to perform better than another code of the same rate that is obtained by halving Q and squaring r. Nevertheless, it is sometimes advantageous to choose a small Q to design a code of a specific rate.

H. If r is chosen a power of two, a standard gray-code assignment of bits to the symbols of the set A may be used.

I. The dispersion matrices $\{A_q\}$ are Hermitian and, in general, complex.

8. Examples of CD Codes and Performance

Example simulations for the performance of CD codes for various numbers of antennas and rates follow. The channel is assumed to be quasi-static, where the fading matrix between the transmitter and receiver is constant (but unknown) between two successive channel uses. Two error events of interest include block errors, which correspond to errors in decoding the M×M matrices $V_1, \ldots, V_L$, and bit errors, which correspond to errors in decoding $\alpha_1, \ldots \alpha_Q$. The bits to be transmitted are mapped to $\alpha_q$ with a gray code and therefore a block error will correspond to only a few bit errors. In some examples, we compare the performance of linearized likelihood (sphere decoding) with true maximum likelihood and nulling/cancelling.

8.1. Simple example: M=2, R=1

For M=2 transmit antennas and rate R=1, the set has L=4 elements. In this case, it turns out that no set can have $\zeta$, defined as $$\varsigma = \dfrac{1}{2}\min_{l \neq l'}|\det(V_l - V_{l'})|^{\frac{1}{M}},$$

larger than $\zeta=mt;epmrl;\sqrt{2/3}rlxmx=0.8165$. The optimal set corresponds to a tetrahedron whose corners lie on the surface of a three-dimensional unit sphere, and one representation of it is given by the four unitary matrices $$V_1 = \begin{bmatrix} \sqrt{1/3}+i\sqrt{2/3} & 0 \\ 0 & \sqrt{1/3}-i\sqrt{2/3} \end{bmatrix}, \tag{23}$$

$$V_2 = \begin{bmatrix} -\sqrt{1/3} & \sqrt{2/3} \\ -\sqrt{2/3} & -\sqrt{1/3} \end{bmatrix},\ V_3 = \begin{bmatrix} -\sqrt{1/3} & -\sqrt{2/3} \\ \sqrt{2/3} & -\sqrt{1/3} \end{bmatrix},$$

$$V_4 = \begin{bmatrix} \sqrt{1/3}-i\sqrt{2/3} & 0 \\ 0 & \sqrt{1/3}+i\sqrt{2/3} \end{bmatrix}$$

There are many equivalent representations, but it turns out that this particular choice can be constructed as a CD code with Q=r=2, and the basis matrices are $$A_1 = \begin{bmatrix} \dfrac{1}{\sqrt{2}(\sqrt{3}+1)} & \dfrac{-i}{\sqrt{2}(\sqrt{3}-1)} \\ \dfrac{i}{\sqrt{2}(\sqrt{3}-1)} & \dfrac{-1}{\sqrt{2}(\sqrt{3}+1)} \end{bmatrix} \text{ and} \tag{24}$$

$$A_2 = \begin{bmatrix} \dfrac{1}{\sqrt{2}(\sqrt{3}+1)} & \dfrac{i}{\sqrt{2}(\sqrt{3}-1)} \\ \dfrac{-i}{\sqrt{2}(\sqrt{3}-1)} & \dfrac{-1}{\sqrt{2}(\sqrt{3}+1)} \end{bmatrix}.$$

The matrices (Eq. No. 23) are generated as the Cayley transform (Eq. No. 1) of $A = A_1\alpha_1 + A_2\alpha_2$, with $\alpha_1, \alpha_2 \in \{-1, 1\}$.

For comparison, we may consider the set based on orthogonal designs for M=2 and R=1 given by $$V_1 = \dfrac{1}{\sqrt{2}}\begin{bmatrix} 1 & 1 \\ -1 & 1 \end{bmatrix},\ V_2 = \dfrac{1}{\sqrt{2}}\begin{bmatrix} -1 & 1 \\ -1 & -1 \end{bmatrix}, \tag{25}$$

$$V_3 = \dfrac{1}{\sqrt{2}}\begin{bmatrix} 1 & -1 \\ 1 & 1 \end{bmatrix},\ V_3 = \dfrac{1}{\sqrt{2}}\begin{bmatrix} -1 & -1 \\ 1 & 1- \end{bmatrix}$$

which has $\zeta=1/\sqrt{2}\approx 0.7071$, or the set $$V_l = \frac{1}{\sqrt{2}} \begin{bmatrix} e^{2\pi i/4} & 0 \\ 0 & e^{2\pi i/4} \end{bmatrix}^{l-1}, l = 1, \ldots, 4$$

which also has $\zeta=0.7071$. Since we are more interested in high rate examples, we do not plot the performance of the CD code (Eq. No. 23); however, simulations show that the performance gain over (Eq. No. 25) is approximately 0.75 dB at high signal to noise ratio ("SNR"). This small example shows that there are good codes within the CD structure at low rates. In this case, the best R=1 code has a CD structure.

8.2. CD Code Using Orthogonal Designs: M=2

Recall from Lemma 3 that a set of unitary matrices is fully-diverse if and only if its Cayley transform set of skew-Hermitian matrices is fully-diverse. For M=2 transmit antennas, a famous fully-diverse set is the orthogonal design of Alamouti, namely $$OD = \begin{bmatrix} x & y \\ -y* & x* \end{bmatrix} \quad (26)$$

Orthogonal designs are readily seen to be fully-diverse since $$\det\left(OD_1 - OD_2\right) = \det\begin{bmatrix} x_1 - x_2 & y_1 - y_2 \\ -(y_1 - y_2)* & (x_1 - x_2)* \end{bmatrix}$$

$$= |x_1 - x_2|^2 + |y_1 - y_2|^2.$$

We require that OD be skew-Hermitian, implying that $$OD = \begin{bmatrix} i\alpha_1 & \alpha_2 + i\alpha_3 \\ -\alpha_2 + i\alpha_3 & -i\alpha_1 \end{bmatrix} = i\underbrace{\begin{bmatrix} \alpha_1 & -i\alpha_2 + \alpha_3 \\ i\alpha_2 + \alpha_3 & -\alpha_1 \end{bmatrix}}_{=A} \quad (27)$$

where the $\alpha_q$'s are real. Thus, we may define a CD code with basis matrices $$A_1 = \begin{bmatrix} 1 & 0 \\ 0 & -1 \end{bmatrix}, A_2 = \begin{bmatrix} 0 & -i \\ i & 0 \end{bmatrix}, A_3 = \begin{bmatrix} 0 & 1 \\ 1 & 0 \end{bmatrix} \quad (28)$$

that generates a fully-diverse set. It can be noted that A1, A2, and A3 form a basis for the real Lie algebra su(2) of traceless Hermitian matrices. Using (Eq. No. 8) yields $$\det(V-V')=4\det(I+iA)^{-1}\det(A'-A)\det(I+A')^{-1},$$

which upon simplification yields $$\det(V - V') = \frac{4(|\alpha_1 - \alpha'_1|^2 + |\alpha_2 - \alpha'_2|^2 + |\alpha_3 - \alpha'_3|^2)}{(1 + |\alpha_1|^2 + |\alpha_2|^2 + |\alpha_3|^2)(1 + |\alpha'_1|^2 + |\alpha'_2|^2 + |\alpha'_3|^2)}. \quad (29)$$

For example, by choosing $\alpha_q \in \{\alpha\}_r$, we get a code with rate R=1.5. The appropriate scaling $\gamma$ is =⅓. The resulting set of eight matrices (which we omit for brevity and because they are readily derived) has $\zeta=1/\sqrt{3}$.

It is noted that the code (Eq. No. 28) is a closed-form solution to (Eq. No. 20) for M=2 and Q=3 because it is a local maximum to the criterion.

8.3. CD Code vs. OD: M=N=2

Figure 1:
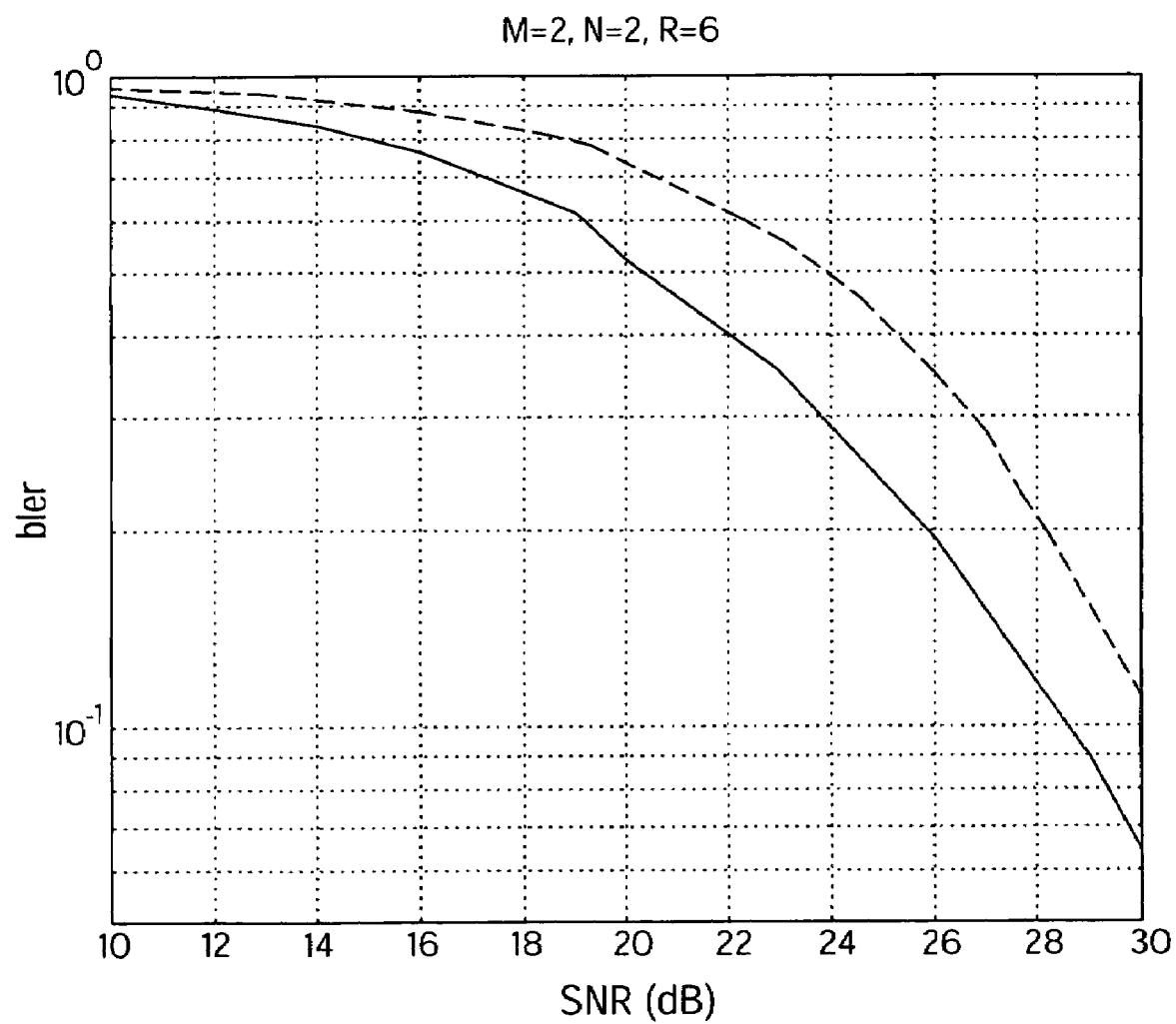
FIG. 1 is a plot of the performance of an example CD code according to an embodiment of the invention for the example circumstances of M=2 transmit and N=2 receive antennas with rate R=6.

For a higher-rate example, we examine another code for M=2, but we choose N=2 and R=6. FIG. 1 shows the performance of a CD code with Q=4. The code is $$A_1 = \begin{bmatrix} 0.1785 & 0.0510 + 0.1340i \\ 0.0510 - 0.1340i & 0.0321 \end{bmatrix},$$

$$A_2 = \begin{bmatrix} -0.1902 & 0.1230 + 0.0495i \\ 0.1230 - 0.0495i & -0.0512 \end{bmatrix},$$

$$A_3 = \begin{bmatrix} -0.2350 & 0.0515 - 0.0139i \\ 0.0515 + 0.0139i & 0.1142 \end{bmatrix},$$

$$A_4 = \begin{bmatrix} 0.0208 & 0.1143 - 0.1532i \\ 0.1143 + 0.1532i & 0.0220 \end{bmatrix}.$$

In FIG. 1, the solid line is the block error rate ("bler" in the FIG.) for the CD code with sphere decoding, and the dashed line is the differential two-antenna orthogonal design with maximum likelihood decoding. To get R=6, choose $\alpha_1, \ldots, \alpha_4 \in A$ where r=8; the distance criterion (Eq. No. 18) for this code is t$\zeta$–1.46. Also included in the figure is the two-antenna differential orthogonal design with the same rate. The CD code obeys the constraint (Eq. No. 14) and therefore can be decoded very quickly using the sphere decoder. A maximum likelihood decoder would have to search over $2^{RM}=2^{12}=4096$ matrices. It is to be noted that FIG. 1 is not intended to illustrate absolute superior performance, rather it illustrates relatively superior performance.

8.4. Comparison with Another Nongroup Code: M=4, N=1, R=4

Figure 2:
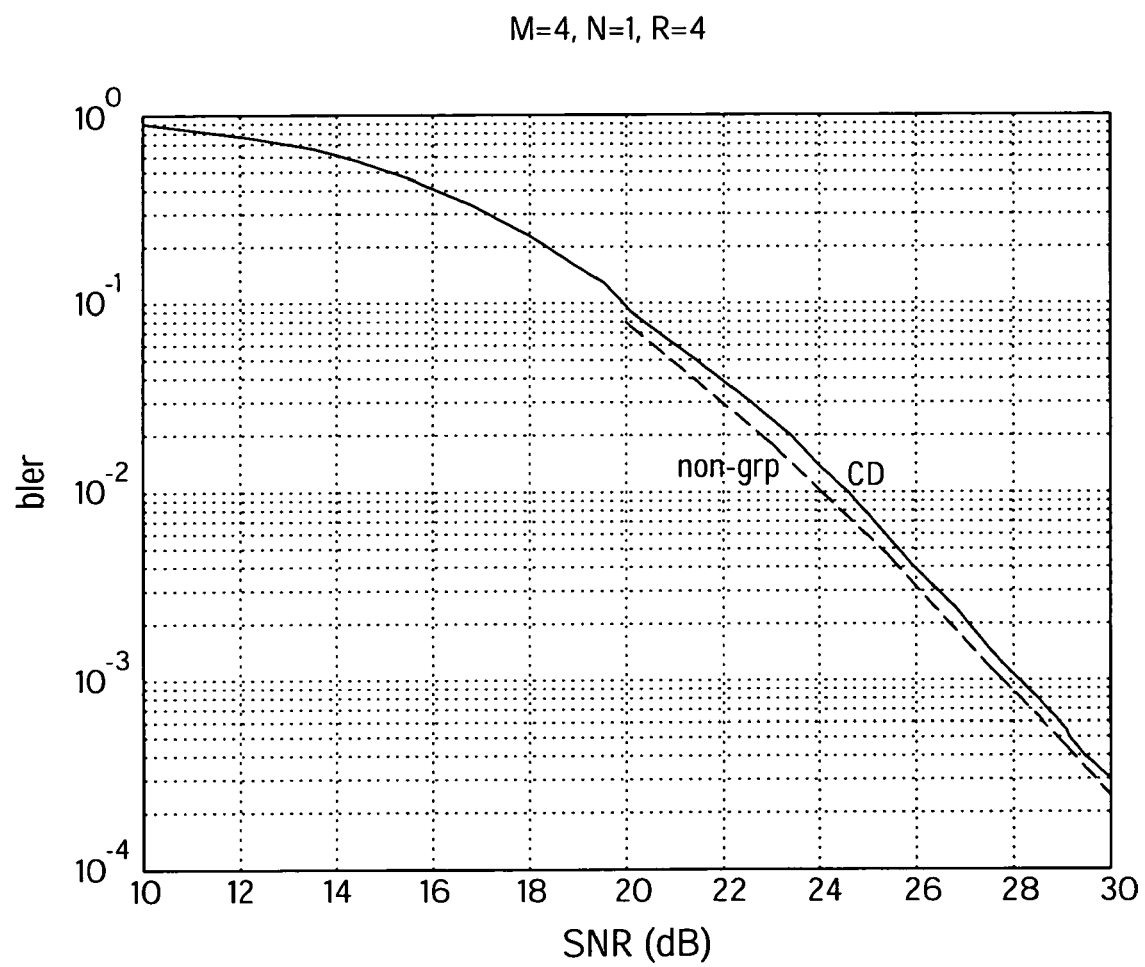
FIG. 2 is a plot of block error performance of an example CD code according to an embodiment of the invention for the example circumstances of M=4 transmit and N=1 receive antennas with rate R=4 compared with a nongroup code.

There are not many performance curves easily available for existing codes for M=R=4 over an unknown channel, but the publication by A. Shokrollahi, B. Hassibi, B. Hochwald, and W. Sweldens, "Representation theory for high-rate multiple-antenna code design," submitted to IEEE Trans. Info. Theory, 2000, http://mars.bell-labs.com, has a nongroup code for N=1 that appears in Table 4 and FIG. 9 of that paper. FIG. 2 compares it to a CD code with the same parameters.

For FIG. 2, the CD code has Q=16, and achieves R=4 by choosing r=2. The 4×4 matrices $A_1, \ldots, A_{16}$ are:

$$A_1 = \begin{bmatrix} 0 - 0.2404i & 0.0004 - 0.0552i & -0.1191 - 0.1226i & -0.1851 + 0.0590i \\ -0.0004 - 0.0552i & 0 + 0.1088i & -0.0254 + 0.0269i & -0.0037 - 0.0552i \\ 0.1191 - 0.1226i & 0.0254 + 0.0269i & 0 - 0.2123i & -0.0070 + 0.0782i \\ 0.1851 + 0.0590i & 0.0037 - 0.0552i & 0.0070 + 0.0782i & 0 + 0.0803i \end{bmatrix}$$

$$A_2 = \begin{bmatrix} 0 + 0.0256i & 0.0680 - 0.0044i & 0.0602 - 0.0450i & 0.1834 - 0.0525i \\ -0.0680 - 0.0044i & 0 + 0.0612i & 0.1373 + 0.0840i & -0.0514 - 0.0203i \\ -0.0602 - 0.0450i & -0.1373 + 0.0840i & 0 - 0.0521i & 0.2104 + 0.1243i \\ -0.1834 - 0.0525i & 0.0514 - 0.0203i & -0.2104 + 0.1243i & 0 + 0.0676i \end{bmatrix}$$

$$A_3 = \begin{bmatrix} 0 - 0.1983i & -0.0603 + 0.0351i & 0.0916 + 0.0494i & 0.1784 - 0.0136i \\ 0.0603 + 0.0351i & 0 + 0.0609i & -0.0190 + 0.0868i & -0.1614 - 0.0575i \\ -0.0916 + 0.0494i & 0.0190 + 0.0868i & 0 + 0.2219i & -0.0621 + 0.0777i \\ -0.1784 - 0.0136i & 0.1614 - 0.0575i & 0.0621 + 0.0777i & 0 - 0.0196i \end{bmatrix}$$

$$A_4 = \begin{bmatrix} 0 + 0.0149i & 0.2168 - 0.0384i & -0.0268 - 0.0702i & -0.0569 - 0.0114i \\ -0.2168 - 0.0384i & 0 + 0.0201i & -0.1388 + 0.0965i & 0.1276 + 0.0793i \\ 0.0268 + 0.0702i & 0.1388 + 0.0965i & 0 - 0.0022i & 0.1576 - 0.0771i \\ 0.0569 - 0.0114i & -0.1276 + 0.0793i & -0.1576 - 0.0771i & 0 + 0.0541i \end{bmatrix}$$

$$A_5 = \begin{bmatrix} 0 - 0.1976i & -0.1267 + 0.0316i & -0.0818 - 0.1269i & -0.0751 - 0.1148i \\ 0.1267 + 0.0316i & 0 - 0.0754i & -0.0671 - 0.1447i & 0.1276 - 0.0364i \\ 0.0818 - 0.1269i & 0.0671 - 0.1447i & 0 + 0.0004i & -0.0336 - 0.0754i \\ 0.0751 - 0.1148i & -0.1276 - 0.0364i & 0.0336 - 0.0754i & 0 - 0.1435i \end{bmatrix}$$

$$A_6 = \begin{bmatrix} 0 - 0.0397i & 0.0041 - 0.0431i & 0.0143 + 0.0019i & -0.0985 - 0.1415i \\ -0.0041 - 0.0431i & 0 + 0.0350i & -0.1616 + 0.1164i & -0.0870 + 0.2128i \\ -0.0143 + 0.0019i & 0.1616 + 0.1164i & 0 + 0.0788i & 0.0720 + 0.0829i \\ 0.0985 - 0.1415i & 0.0870 + 0.2128i & -0.0720 + 0.0829i & 0 + 0.0251i \end{bmatrix}$$

$$A_7 = \begin{bmatrix} 0 + 0.1418i & 0.0244 + 0.1003i & 0.0575 - 0.0581i & -0.0472 - 0.0349i \\ -0.0244 + 0.1003i & 0 - 0.1984i & -0.0059 - 0.0304i & -0.0735 - 0.2520i \\ -0.0575 - 0.0581i & 0.0059 - 0.0304i & 0 + 0.1012i & -0.1113 + 0.0231i \\ 0.0472 - 0.0349i & 0.0735 - 0.2520i & 0.1113 + 0.0231i & 0 + 0.0742i \end{bmatrix}$$

$$A_8 = \begin{bmatrix} 0 - 0.0335i & -0.0190 - 0.1533i & 0.0112 - 0.0098i & -0.0781 - 0.1095i \\ 0.0190 - 0.1533i & 0 - 0.0862i & 0.0116 + 0.1090i & -0.1356 - 0.1393i \\ -0.0112 - 0.0098i & -0.0116 + 0.1090i & 0 + 0.0421i & 0.1032 - 0.1622i \\ 0.0781 - 0.1095i & 0.1356 - 0.1393i & -0.1032 - 0.1622i & 0 + 0.1190i \end{bmatrix}$$

$$A_9 = \begin{bmatrix} 0 + 0.1257i & 0.0192 + 0.0658i & 0.0312 - 0.0430i & -0.0170 + 0.0031i \\ -0.0192 + 0.0658i & 0 + 0.3621i & -0.0893 + 0.0286i & -0.0588 + 0.1090i \\ -0.0312 - 0.0430i & 0.0893 + 0.0286i & 0 - 0.1343i & -0.0469 - 0.1561i \\ 0.0170 + 0.0031i & 0.0588 + 0.1090i & 0.0469 - 0.1561i & 0 - 0.0202i \end{bmatrix}$$

$$A_{10} = \begin{bmatrix} 0 - 0.1220i & -0.0534 + 0.0239i & -0.0291 - 0.0339i & 0.0094 - 0.0649i \\ 0.0534 + 0.0239i & 0 - 0.0337i & -0.1484 + 0.0921i & 0.0813 - 0.0134i \\ 0.0291 - 0.0339i & 0.1484 + 0.0921i & 0 + 0.0159i & -0.1116 - 0.1673i \\ -0.0094 - 0.0649i & -0.0813 - 0.0134i & 0.1116 - 0.1673i & 0 + 0.3019i \end{bmatrix}$$

$$A_{11} = \begin{bmatrix} 0 - 0.0848i & -0.0902 + 0.0471i & -0.0578 + 0.0636i & 0.0540 - 0.0904i \\ 0.0902 + 0.0471i & 0 + 0.0301i & 0.1250 + 0.0087i & 0.0597 - 0.0539i \\ 0.0578 + 0.0636i & -0.1250 + 0.0087i & 0 + 0.2837i & -0.0252 + 0.2114i \\ -0.0540 - 0.0904i & -0.0597 - 0.0539i & 0.0252 + 0.2114i & 0 + 0.0332i \end{bmatrix}$$

$$A_{12} = \begin{bmatrix} 0 + 0.0781i & 0.1675 + 0.0064i & -0.0349 - 0.0324i & 0.1939 - 0.0375i \\ -0.1675 + 0.0064i & 0 - 0.1216i & 0.0977 + 0.0318i & -0.0768 - 0.1414i \\ 0.0349 - 0.0324i & -0.0977 + 0.0318i & 0 - 0.1522i & -0.0964 + 0.0526i \\ -0.1939 - 0.0375i & 0.0768 - 0.1414i & 0.0964 + 0.0526i & 0 + 0.0508i \end{bmatrix}$$

-continued $$A_{13} = \begin{bmatrix} 0-0.0117i & 0.0628-0.0848i & 0.1047-0.1017i & 0.0316+0.0272i \\ -0.0628-0.0848i & 0-0.0322i & -0.0848+0.0371i & 0.1228+0.0154i \\ -0.1047-0.1017i & 0.0848+0.0371i & 0-0.1907i & -0.2330-0.0132i \\ -0.0316+0.0272i & -0.1228+0.0154i & 0.2330-0.0132i & 0-0.1408i \end{bmatrix}$$

$$A_{14} = \begin{bmatrix} 0+0.1587i & -0.0038-0.0996i & -0.1055-0.1272i & 0.1282-0.1698i \\ 0.0038-0.0996i & 0-0.0848i & -0.0883-0.0334i & -0.0280+0.1595i \\ 0.1055-0.1272i & 0.0883-0.0334i & 0-0.0480i & 0.0030-0.0765i \\ -0.1282-0.1698i & 0.0280+0.1595i & -0.0030-0.0765i & 0+0.0256i \end{bmatrix}$$

$$A_{15} = \begin{bmatrix} 0-0.0574i & 0.1189-0.0981i & -0.0998-0.0472i & -0.0315-0.0113i \\ -0.1189-0.0981i & 0+0.0527i & 0.0116+0.1028i & 0.1104-0.0912i \\ 0.0998-0.0472i & -0.0116+0.1028i & 0+0.2906i & 0.1081+0.0020i \\ 0.0315-0.0113i & -0.1104-0.0912i & -0.1081+0.0020i & 0-0.1787i \end{bmatrix}$$

$$A_{16} = \begin{bmatrix} 0-0.0315i & 0.0136+0.0632i & -0.0392+0.1217i & -0.2722+0.0216i \\ -0.0136+0.0632i & 0+0.0899i & -0.0040-0.0596i & 0.1057-0.0382i \\ 0.0392+0.1217i & 0.0040-0.0596i & 0+0.1765i & 0.0531-0.0535i \\ 0.2722+0.0216i & -0.1057-0.0382i & -0.0531-0.0535i & 0+0.0908i \end{bmatrix}$$

In FIG. 2, $\zeta=-1.46$. The nongroup code, which has its origin in a group code, performs better but the difference is very small. Observe that $Q=M^2>2MN-N^2=7$ and therefore the inequality (Eq. No. 14) is not satisfied, but it does not matter in this case because the decoding for both codes is true maximum likelihood (rather than sphere decoding or nulling/cancelling). This example is not very practical because maximum likelihood decoding involves a search over $2^{RM}=2^{16}=65,536$ matrices. However, this same CD code is used in the next example where, by increasing the number of receive antennas to $N=2$, we are able to solve the linearized likelihood with sphere decoding.

8.5. Linearized vs. Exact ML: $M=4$, $N=2$, $R=4$

Figure 3:
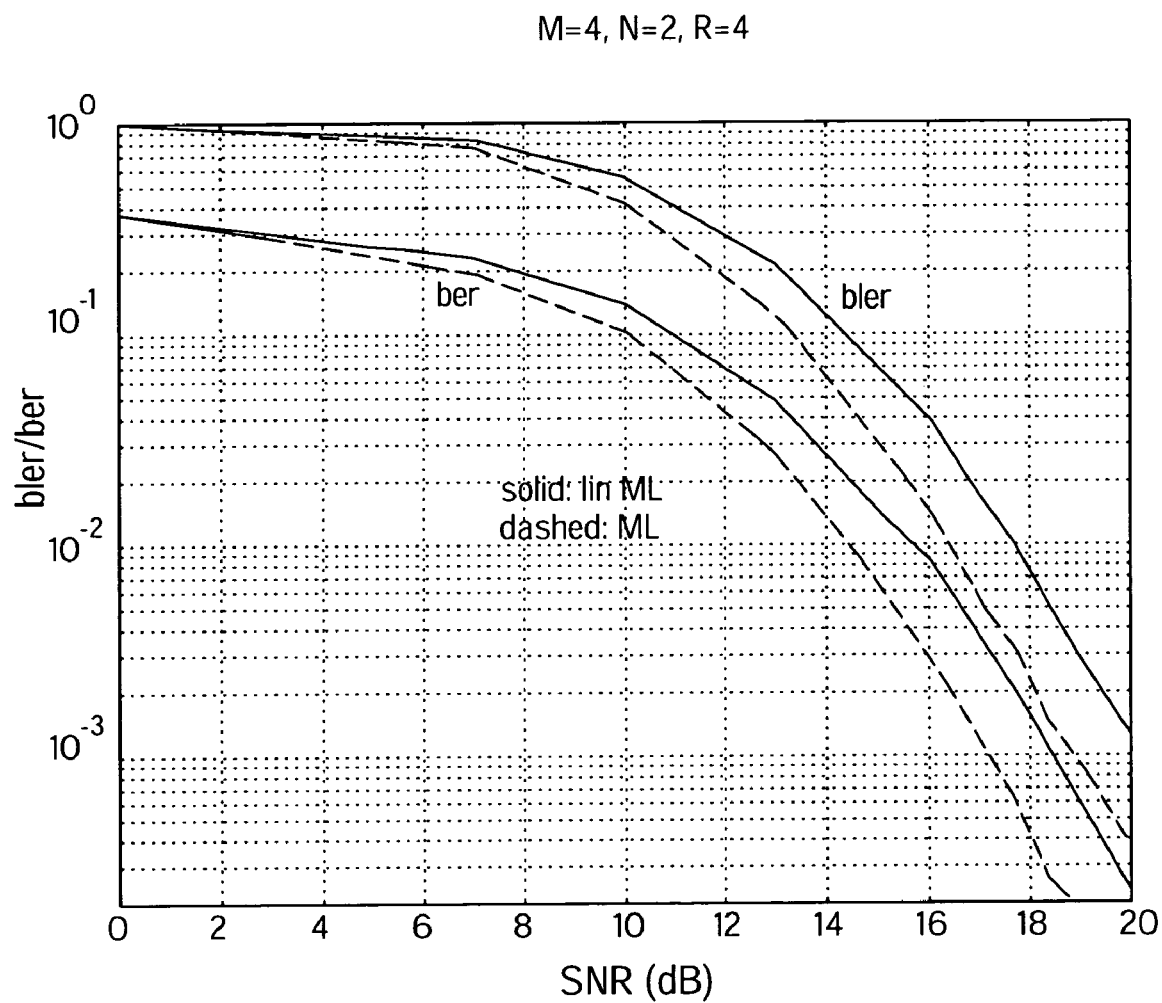
FIG. 3 is a plot of the performance of an example CD code according to an embodiment of the invention for the example circumstances of M=4 transmit and N=2 receive antennas with rate R=4.

By increasing the number of receive antennas in the previous example to $N=2$, we may linearize the likelihood and compare the performance with the true maximum likelihood. FIG. 3 shows the results. In FIG. 3, the solid lines are the block error rate ("bler" in the FIG.) and the bit error rates ("ber" in the FIG.) for the CD code with sphere decoding, and the dashed lines are the block/bit error rates with maximum likelihood decoding. The same CD code as in the example of FIG. 2 is used.

In the example of FIG. 3, observe that $Q>2MN-N^2=12$ and therefore the inequality (Eq. No. 14) is still not obeyed; but because it is almost obeyed, the sphere decoder of the linearized likelihood searches over only $16-12=4$ dimensions. With $r=2$, this search is over $2^4=16$ quantities, which is a negligible burden. Compare this burden with the true maximum likelihood (65,536 matrices). FIG. 3 shows that the performance loss for linearizing the likelihood is approximately 1.3 dB at high SNR. While the performance of linearized maximum likelihood is slightly worse than true maximum likelihood, the next figure shows that the performance of nulling/cancelling is much worse than either.

8.6 Sphere decoding vs. nulling/cancelling: $M=N=4$, $R=8$

Figure 4:
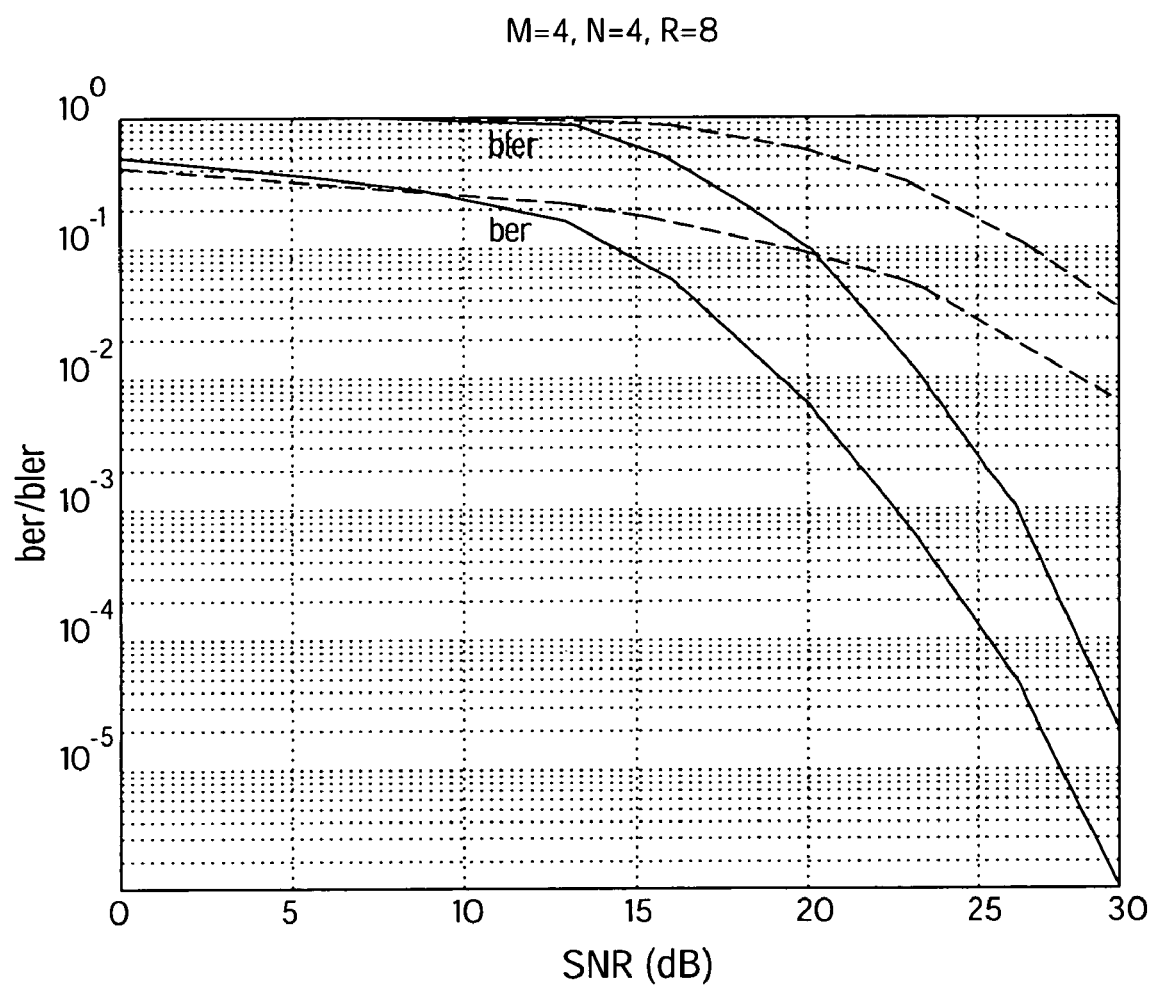
FIG. 4 is a plot of the performance of an example CD code according to an embodiment of the invention for the example circumstances of M=4 transmit and N=4 receive antennas with rate R=8.

FIG. 4 shows the performance of a CD code for $M=4$ transmit and $N=4$ receive antennas for rate $R=8$ with linearized-likelihood decoding. In FIG. 4, the solid lines are the block and bit error rates for sphere decoding and the dashed lines are for nulling/cancelling. The performance advantage of sphere decoding is dramatic. As in the previous example of FIG. 3, $Q=16$, but to achieve $R=8$ we choose $r=4$. Again, the explicit description of $A_1, \ldots, A_{16}$ is omitted for brevity and because they are readily derived; $\xi=-1.36$.

Also plotted in FIG. 4 is a comparison of the same CD code with nulling/cancelling decoding. We see that sphere decoding is significantly better. True maximum likelihood decoding is not realistic in this example because there are $2^{RM}=2^{32}\approx4\times10^9$ matrices in the codebook.

8.7 High-Rate Example: $M=8$, $N=12$, $R=16$

Figure 5:
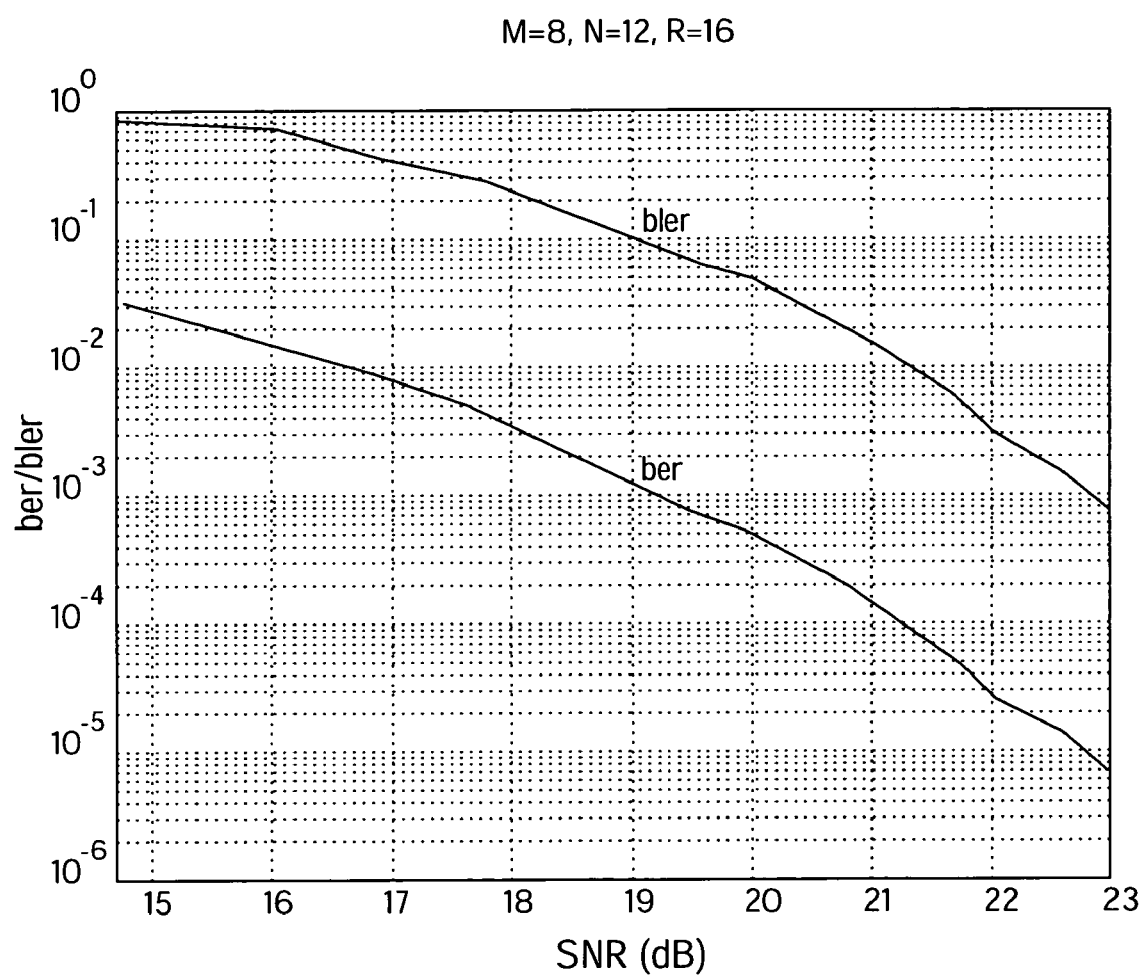
FIG. 5 is a plot of the performance of an example CD code according to an embodiment of the invention for the example circumstances of M=8 transmit and N=12 receive antennas with rate R=16.

Some of the original V-BLAST experiments use eight transmit and twelve receive antennas to transmit more than 20 bits/second/Hz. FIG. 5 shows that high rates with reasonable decoding complexity are also within reach of the CD codes. In FIG. 5, the solid lines are the block and bit error rates for sphere decoding.

Plotted in FIG. 5 are the block and bit error rates for $R=16$; here $Q=64$ and $r=4$. The CD matrices are again omitted for brevity and because they are readily derived; $\xi=-1.48$. We note that because $M=8$, the effective set size of the set of unitary matrices is $L=2^{RM}=2^{128}\approx3.4\times10^{38}$, yet we may still easily sphere decode the linearized likelihood.

9. Recap

The Cayley differential codes we have introduced do not require channel knowledge at the receiver, are simple to encode and decode, apply to any combination of one or more transmit and one or more receive antennas, and have excellent performance at very high rates. They are designed with a probabilistic criterion: they maximize the expected log-determinant of the difference between matrix pairs.

The CD codes make use of the Cayley transform that maps the nonlinear Stiefel manifold of unitary matrices to the linear space of skew-Hermitian matrices. The transmitted data is broken into substreams $\alpha_1, \ldots, \alpha_Q$ and then linearly encoded in the Cayley transform domain. We showed that $\alpha_1, \ldots, \alpha_Q$ appear linearly at the receiver and can be decoded by nulling/cancelling or sphere decoding by ignoring the data dependence of the additive noise. Additional channel coding across $\alpha_1, \ldots, \alpha_Q$ or from block to block can be combined with a CD code to lower the error probability even further.

Finally, we choose $\alpha_q$'s from a set A designed to help make the final A matrix behave, on average, like a Cauchy random matrix.

Applicants hereby incorporate by reference the entirety of their internet-published paper, "Cayley Differential Unitary Space-Time Codes", available at http://mars.bell-labs.com/cm/ms/what/mars/papers/cayley/.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

Appendix

Gradient of Criterion (Eq. No. 20)

In all the simulations presented in this paper the maximization of the design criterion function in (Eq. No. 20), needed to design the CD codes, is performed using a simple constrained-gradient-ascent method. In this section, we compute the gradient of (Eq. No. 20) that this method requires. More sophisticated optimization techniques that we do not consider, such as Newton-Raphson, scoring, and interior-point methods, can also use this gradient.

From (Eq. No. 20), the criterion function is $$\frac{1}{M} E \log \det(V - V')(V - V')^* = \log 4 - \frac{1}{M} E \log \det(I + A^2) - \frac{1}{M} E \log \det(I + A'^2) + \frac{1}{M} E \log \det(A' - A)^2$$

where $A = \sum_{q=1}^{Q} A_q \alpha_q$ and $A' = \sum_{q=1}^{Q} A_q \alpha'_q$. We are interested in the gradient of this function with respect to the matrices $A_1, \ldots, A_Q$. To compute the gradient of a real function $f(A_q)$ with respect to the entries of the Hermitian matrix $A_q$, we use the formulas $$\left[\frac{\partial f(A_q)}{\partial \operatorname{Re} A_q}\right]_{j,k} = \lim_{\delta \to 0} \frac{1}{\delta}[f(A_q + \delta(e_j e_k^T + e_k e_j^T)) - f(A_q)], \, j \neq k \quad (A.2)$$

$$\left[\frac{\partial f(A_q)}{\partial \operatorname{Im} A_q}\right]_{j,k} = \lim_{\delta \to 0} \frac{1}{\delta}[f(A_q + i\delta(e_j e_k^T + e_k e_j^T)) - f(A_q)], \, j \neq k \quad (A.3)$$

$$\left[\frac{\partial f(A_q)}{\partial A_q}\right]_{j,j} = \lim_{\delta \to 0} \frac{1}{\delta}[f(A_q + \delta e_j e_m^T) - f(A_q)], \quad (A.4)$$

where $e_j$ is the M-dimensional unit column vector with a one in the $j^{th}$ entry and zeros elsewhere.

To apply (Eq. No. A.2) to the second term in (Eq. No. A.1), we compute $$\log\det(I + (A + (e_j e_k^T + e_k e_j^T)\alpha_q \delta)^2) = \log\det(I + A^2 + [A(e_j e_k^T + e_k e_j^T) + (e_j e_k^T + e_k e_j^T)A]\alpha_q \delta + O(\delta^2))$$

$$= \log\det[(I + A^2)(I + (I + A^2)^{-1}[A(e_j e_k^T + e_k e_j^T) +$$

$$(e_j e_k^T + e_k e_j^T)A]\alpha_q \delta + O(\delta^2))]$$

$$= \log\det(I + A^2) + tr\log(I +$$

$$(I + A^2)^{-1}[A(e_j e_k^T + e_k e_j^T) +$$

$$(e_j e_k^T + e_k e_j^T)A]\alpha_q \delta + O(\delta^2))$$

$$= \log\det(I + A^2) + tr[(I +$$

$$A^2)^{-1}[A(e_j e_k^T + e_k e_j^T) +$$

$$(e_j e_k^T + e_k e_j^T)A]\alpha_q \delta] + O(\delta^2)$$

$$= \log\det(I + A^2) +$$

$$\begin{bmatrix} [(I + A^2)^{-1}A]_{k,j} + \\ [(I + A^2)^{-1}A]_{j,k} + \\ [A(I + A^2)^{-1}]_{k,j} + \\ [A(I + A^2)^{-1}]_{j,k} \end{bmatrix} \alpha_q \delta +$$

$$O(\delta^2)$$

$$= \log\det(I + A^2) + 4\operatorname{Re}[(I + A^2)^{-1}A]_{j,k} \alpha_q \delta + O(\delta^2).$$

The last equality follows because $(I+A^2)^{-1}$ and A commute and A is Hermitian. We may now apply (Eq. No. A.2) to obtain $$\left[\frac{\partial E \log\det(I + A^2)}{\partial \operatorname{Re} A_q}\right]_{j,k} = 4E \operatorname{Re}[(I + A^2)^{-1}A]_{j,k} \alpha_q, \, j \neq k$$

The gradient with respect to the imaginary components of Aq is handled in a similar way to obtain $$\log\det(I + (A + (e_j e_k^T - e_k e_j^T)\alpha_q i\delta)^2) = \log\det(I + A^2) + tr[(I +$$

$$A^2)^{-1}[A(e_j e_k^T - e_k e_j^T) +$$

$$(e_j e_k^T - e_k e_j^T)A]\alpha_q i\delta] +$$

$$O(\delta^2)$$

$$= \log\det(I + A^2) +$$

$$\begin{bmatrix} [(I + A^2)^{-1}A]_{k,j} - \\ [(I + A^2)^{-1}A]_{j,k} + \\ [A(I + A^2)^{-1}]_{k,j} - \\ [A(I + A^2)^{-1}]_{j,k} \end{bmatrix} \alpha_q i\delta +$$

$$O(\delta^2)$$

$$= \log\det(I + A^2) + 4\operatorname{Im}[(I + A^2)^{-1}A]_{j,k} \alpha_q \delta + O(\delta^2)$$

which yields $$\left[\frac{\partial E \log\det(I + A^2)}{\partial \operatorname{Im} A_q}\right]_{j,k} = 4E \operatorname{Im}[(I + A^2)^{-1}A]_{j,k} \alpha_q, \, j \neq k$$

The gradient with respect to the diagonal elements is $$\left[\frac{\partial E\log\det(I+A^2)}{\partial A_q}\right]_{k,k} = 2E[(I+A^2)^{-1}]_{j,j}\alpha_q.$$

The third term in (Eq. No. A.1) has the same derivative as the second term.

For the fourth term, note that $$A' - A = \sum_{q=1}^{Q} A_q \beta_q$$

where $\beta_q = \alpha'_q - \alpha_q$. Therefore, $$\begin{aligned}\log\det(A+(e_je_k^T+e_ke_j^T)\delta\beta_q)^2 &= \log\det(A(I+A^{-1}(e_je_k^T+e_ke_j^T)\delta\beta_q))^2\\ &= \log\det(A(I+A^{-1}(e_je_k^T+e_ke_j^T)\delta\beta_q)A(I+\\ &\quad A^{-1}(e_je_k^T+(e_je_j^T)\delta\beta_q))\\ &= \log\det A^2 + 2tr\,\log(I+A^{-1}(e_je_k^T+\\ &\quad e_ke_j^T)\delta\beta_q) + O(\delta^2)\\ &= \log\det A^2 + 2tr[A^{-1}(e_je_k^T+e_ke_j^T)\delta\beta_q] +\\ &\quad O(\delta^2)\\ &= \log\det A^2 + 2([A^{-1}]_{k,j}+[A^{-1}]_{j,k})\delta\beta_q\\ &= \log\det A^2 + 4\,\text{Re}[A^{-1}]_{j,k}\delta\beta_q.\end{aligned}$$

Hence, $$\left[\frac{\partial E\log\det(A'-A)^2}{\partial \text{Re}\,A_q}\right]_{j,k} = 4\,\text{Re}[A^{-1}]_{j,k}\beta_q,\ j\neq k$$

For brevity, the computation of the derivatives with respect to the imaginary and diagonal components of $A_q$ is omitted. The results are $$\left[\frac{\partial E\log\det(A'-A)^2}{\partial \text{Im}\,A_q}\right]_{j,k} = 4E\,\text{Im}[A^{-1}]_{j,k}\beta_q,\ j\neq k$$

and $$\left[\frac{\partial E\log\det(A'-A)^2}{\partial A_q}\right]_{j,j} = 2E[A^{-1}]_{j,j}\beta_q.$$

What is claimed is:

1. A method of wireless differential communication, the method comprising:
   generating a plurality of baseband signals based on Cayley-encoded input data;
   modulating said baseband signals on a carrier to form carrier-level signals; and
   transmitting said carrier-level signals from at least one antenna.

2. The method of claim 1, wherein each baseband signal is also based on a previous baseband signal that corresponds to a previously-transmitted carrier-level signal.

3. The method of claim 2, wherein
   said transmitting step transmits from a multiple antenna array;
   each baseband signal includes one or more sequences, in time, of complex numbers, each sequence to be transmitted from a respective antenna of said multiple antenna array; and
   each baseband signal is representable as a transmission matrix in which each column corresponds to one of said sequences and represents a respective antenna and in which each row represents a respective time segment.

4. The method of claim 3, wherein said generating step generates each transmission matrix based upon said input data and a previous transmission matrix representing previously transmitted baseband signals.

5. The method of claim 4, wherein said input data is a set from a plurality of sets providing a highest transmission quality out of said plurality of sets.

6. The method of claim 4, wherein, for a total number of bits of data to be transmitted, said generating step includes:
   breaking said total number of bits into same-sized chunks;
   mapping each of said chunks to take a value from a predetermined set of real values to obtain a scalar set;
   determining a Cayley-Differential ("CD") code based upon said scalar set; and
   determining said transmission matrix based on said CD code.

7. The method of claim 6, wherein said step of determining said CD code includes calculating said CD code, V, according to the following equation:

$$V=(I+iA)^{-1}(I-iA)$$

where $$A = \sum_{q=1}^{Q} \alpha_q A_q$$

and V is a unitary matrix, and where $\alpha_q$ is a scalar, I is the identity matrix, $A_q$ represents an element from a set of fixed M×M complex Hermitian matrices, M is the number of transmit antennas, and Q represents the number of degrees of freedom.

8. The method of claim 7, wherein said set, $\{A_q\}$, of fixed M×M complex Hermitian matrices is determined by maximizing over $\{A_q\}$ according to:

$$\xi(V) = \frac{1}{M}E\log\det(V-V')(V-V')^*$$

where $A' = \sum_{q=1}^{Q} \alpha'_q A_q$ and $\alpha\neq\alpha'$.

9. The method of claim 8, wherein said $\{A_q\}$ is stored in memories of both a transmitter and a corresponding receiver before data to be transmitted is transmitted.

10. The method of claim 6, wherein:
   said total number of bits equals R*M, where R is the rate in bits per channel use and M is the number of transmit antennas;
   said number of chunks is Q, where Q represents the number of degrees of freedom; and
   each chunk is R*M/Q bits in size.

11. The method of claim 6, wherein said predetermined set of real values, hereafter referred to as A, is determined according to the following equation:

$$d = -\tan(\theta/2)$$

for every θ in the set $\{\theta\} = \{\pi/r, 3\pi/r, 5\pi/r, \ldots (2r-1)\pi/r\}$, where d∈A, r is the number of elements in said A and $r = 2^{R*M/Q}$.

12. The method of claim 11, wherein said A is stored in memories of both a transmitter and a corresponding receiver before data to be transmitted is transmitted.

13. The method of claim 6, wherein said generating step includes calculating said transmission matrix, $S_\tau$, according to the following equation:

$$S_\tau = V_{Z_\tau} S_{\tau-1}$$

where $V_{Z_\tau}$ is generated in part according to said CD code and $S_{\tau-1}$ represents the previous transmission matrix.

14. A method of wireless differential communication, the method comprising:
   receiving receive carrier-level signals, each of which is formed from at least one transmit carrier-level signal transmitted from at least one transmitter antenna passing through a channel, using at least one receiver antenna;
   demodulating said receive carrier-level signals to recover a plurality of Cayley-encoded receive baseband signals; and
   processing said receive baseband signals to obtain data represented thereby.

15. The method of claim 14, wherein each receive baseband signal depends on said data as encoded therein and a previously-received receive baseband signal that corresponds to a previously-transmitted carrier-level signal.

16. The method of claim 15, wherein each receive baseband signal includes one or more receive sequences, in time, of complex numbers; and
   wherein each receive baseband signal is representable as a reception matrix in which each column corresponds to one of said receive sequences and represents a respective receiver antenna and in which each row represents a respective time segment.

17. The method of claim 16, wherein said transmit carrier-level signals were formed from a plurality of transmit baseband signals, each transmit baseband signal including one or more transmit sequences, in time, of complex numbers, each transmit sequence having been transmitted from a respective antenna of a multiple antenna array, each transmit baseband signal being representable as a transmission matrix in which each column corresponds to one of said transmit sequences and represents a respective transmit antenna and in which each row represents a respective time segment, each transmission matrix being based on a transmission matrix representing a previously transmitted transmit baseband signal and input data.

18. The method of claim 15, wherein said processing step includes searching a predetermined set of real scalar values to assemble a set $\{\alpha_q\}$ that minimizes one of the following equations:

$$\hat{\alpha}_{ml} = \arg\min_{\{\alpha_q\}} \left\| \left(I + i\sum_{q=1}^{Q} \alpha_q A_q\right)^{-1} \left(X_\tau - X_{\tau-1} - \frac{1}{i}\sum_{q=1}^{Q} \alpha_q A_q (X_\tau + X_{\tau-1})\right) \right\|^2$$

or $$\hat{\alpha}_{lin} = \arg\min_{\{\alpha_q\}} \left\| X_\tau - X_{\tau-1} - \frac{1}{i}\sum_{q=1}^{Q} \alpha_q A_q (X_\tau + X_{\tau-1}) \right\|^2$$

where $A_q$ represents an element from a set $\{A_q\}$ of fixed M×M complex Hermitian matrices, $X_\tau$ represents a presently-received distorted version of a presently transmitted matrix of data, $X_{\tau-1}$ represents a previously-received distorted version of a previously-transmitted matrix of data, M is the number of transmit antennas, and Q represents the number of degrees of freedom.

19. The method of claim 18, wherein said $\{A_q\}$ is stored in the memories of both the receiver and a corresponding transmitter the before said data to be transmitted is transmitted.

20. The method of claim 18, wherein R*M bits of data are received, where R is the rate in bits per channel use M is the number of transmit antennas, the method further comprising:
   mapping each element of said $\{\alpha_q\}$ into corresponding R*M/Q bits, where Q represents the number of degrees of freedom, to get Q chunks; and
   reassembling said Q chunks of said R*M/Q bits to produce the R*M bits of data that were transmitted.

21. A machine implemented method of wireless differential communication, the machine implemented method comprising:
   generating a set, $\{A_q\}$ of fixed M×M complex Hermitian matrices for which ξ(V) satisfies a maximization criterion and ξ(V) is defined by the following equation:

$$\xi(V) = \frac{1}{M} E \log \det(V - V')(V - V')^*$$

where $V = (I + iA)^{-1}(I + iA)$, $V' = (I + iA')^{-1}(I + iA')$, $$A = \sum_{q=1}^{Q} \alpha_q A_q$$

$$A' = \sum_{q=1}^{Q} A_q \alpha'_q \text{ and } \alpha \neq \alpha',$$

where $A_q$ is a fixed M×M complex Hermitian matrix, each $a_9$ is real-valued scalar from a predetermined set thereof, M is the number of transmit antennas, and Q represents the number of degrees of freedom; and
   performing at least one of
      generating a plurality of baseband signals based on input data encoded as a function of said $\{A_q\}$, and
      processing a plurality of encoded receive baseband signals to obtain data represented thereby, said receive baseband signals having been encoded as a function of said $\{A_q\}$.

22. The method of claim 21, further comprising:
   storing said $\{A_q\}$ in memories of both a receiver and a corresponding transmitter before data to be transmitted is transmitted.

23. A machine implemented method of wireless differential communication, the machine implemented method comprising:

generating a set, A, of real-valued scalars according to the following equation:

$d = -\tan(\theta/2)$ for every θ in the set $\{\theta\} = \{\pi/r, 3\pi/r, 5\pi/r, \ldots (2r-1)\pi/r\}$, where d∈A, r is the number of elements in said A and $r=2^{R*M/Q}$, and where R is the rate in bits per channel use, M is the number of transmit antennas, and Q represents the number of degrees of freedom; and performing at least one of generating a plurality of baseband signals based on input data encoded as a function of values taken from said A, and processing a plurality of encoded receive baseband signals to obtain data represented thereby, said receive baseband signals having been encoded as a function of values taken from said A.

24. The method of claim 23, further comprising:

storing said A in memories of both a receiver and a corresponding transmitter before data to be transmitted is transmitted.

25. A machine operable to perform the method of claim 1.

26. A computer-readable medium having code portions embodied thereon that, when read by a processor, cause said processor to perform the method of claim 1.

27. A machine operable to perform the method of claim 14.

28. A computer-readable medium having code portions embodied thereon that, when read by a processor, cause said processor to perform the method of claim 14.

29. A machine operable to perform the method of claim 21.

30. A computer-readable medium having code portions embodied thereon that, when read by a processor, cause said processor to perform the method of claim 21.

31. A machine operable to perform the method of claim 23.

32. A computer-readable medium having code portions embodied thereon that, when read by a processor, cause said processor to perform the method of claim 23.

* * * * *